United States Patent
Wang et al.

[11] Patent Number: 5,979,763
[45] Date of Patent: Nov. 9, 1999

[54] SUB-PIXEL DATAFORM READER WITH DYNAMIC NOISE MARGINS

[75] Inventors: Ynjiun P. Wang; Angi Ye, both of Fort Myers, Fla.

[73] Assignee: Metanetics Corporation, Fort Myers, Fla.

[21] Appl. No.: 08/543,122

[22] Filed: Oct. 13, 1995

[51] Int. Cl.$^6$ ........................................ G06K 7/10
[52] U.S. Cl. ................. 235/462.17; 235/462.16; 235/462.41; 382/273
[58] Field of Search .................. 382/470, 472, 382/473; 235/462, 463, 462.16, 462.17, 462.27, 462.41

[56] References Cited

U.S. PATENT DOCUMENTS

| | | | |
|---|---|---|---|
| 4,219,152 | 8/1980 | Couch et al. .............. | 235/463 |
| 4,351,004 | 9/1982 | Choate et al. . | |
| 4,360,798 | 11/1982 | Swartz et al. .............. | 382/273 |
| 4,720,745 | 1/1988 | DeForest et al. . | |
| 4,798,943 | 1/1989 | Cherry ........................ | 235/463 |
| 4,908,875 | 3/1990 | Assael et al. .............. | 382/272 |
| 4,980,544 | 12/1990 | Winter ........................ | 235/462 |
| 5,196,684 | 3/1993 | Lum et al. . | |
| 5,245,677 | 9/1993 | Lepore et al. .............. | 382/272 |
| 5,247,166 | 9/1993 | Cannon et al. . | |
| 5,286,960 | 2/1994 | Longacre et al. . | |
| 5,296,690 | 3/1994 | Chandler et al. . | |
| 5,319,181 | 6/1994 | Shellhammer et al. . | |
| 5,329,105 | 7/1994 | Klancnik et al. . | |
| 5,347,594 | 9/1994 | Grimaud .................... | 382/273 |
| 5,373,147 | 12/1994 | Noda . | |
| 5,378,883 | 1/1995 | Batterman et al. . | |
| 5,384,451 | 1/1995 | Smith et al. . | |
| 5,449,893 | 9/1995 | Bridgelall et al. ........ | 235/462 |
| 5,553,167 | 9/1996 | Dowling .................... | 382/270 |
| 5,583,659 | 12/1996 | Lee et al. .................. | 382/270 |
| 5,617,484 | 4/1997 | Wada et al. .............. | 382/273 |
| 5,694,493 | 12/1997 | Tuli ............................ | 382/270 |

FOREIGN PATENT DOCUMENTS

| | | |
|---|---|---|
| 0484935 | 5/1992 | European Pat. Off. . |
| 0591635 | 4/1994 | European Pat. Off. . |

OTHER PUBLICATIONS

Wai–Hon, L., "Signal Processing Techniques for CCD Image Sensors",*Applied Optics*, vol. 23, No. 23, Dec. 1984, pp. 4280–4284.

*Primary Examiner*—Donald Hajec
*Assistant Examiner*—Mark Tremblay
*Attorney, Agent, or Firm*—Benesch, Friedlander, Coplan & Aronoff LLP

[57] ABSTRACT

Sub-pixel processing of image data representing a dataform, such as a 2D bar code, enables reading of dataforms including more data/smaller elements, without costly increases in sensor and memory capacity. Whole pixel processing is employed for pixel-per-element resolutions of two or better. Sub-pixel cell edge transition location in image data is enhanced by use of a dynamically implemented noise margin applied with bands of gray scale values designated within the envelope of applicable gray scale maximum and minimum values. Sub-pixel cell edge transition location employs selection of transition segments (subject to the noise margin) and determination of a dynamic threshold for each relevant transition segment. The intersection of the threshold and the transition segment is then indicative of the location of the cell edge transition along a sampling line crossing the dataform. The process is repeated for successive cell edges along image data sampling lines and for additional sampling lines crossing successive rows of dataform elements. Run length data representing cell edge transition locations is constructed and usable for dataform decoding.

18 Claims, 12 Drawing Sheets

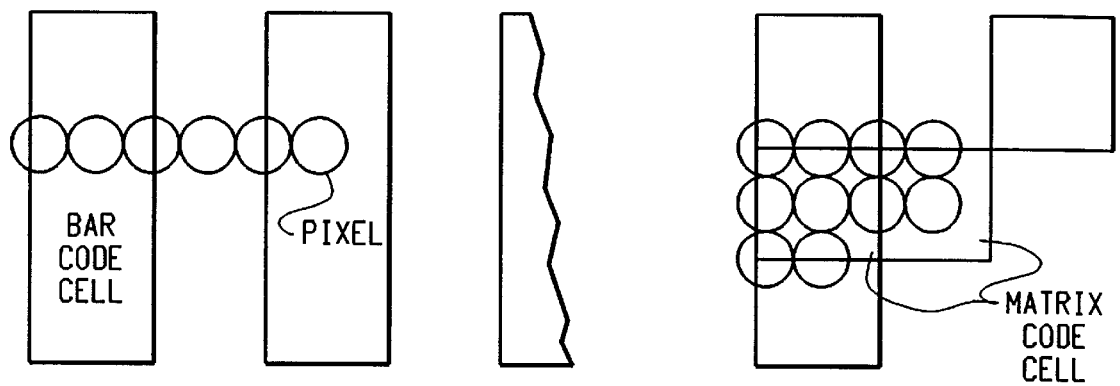
Fig. 1A
(PRIOR ART)
Fig. 1B
(PRIOR ART)
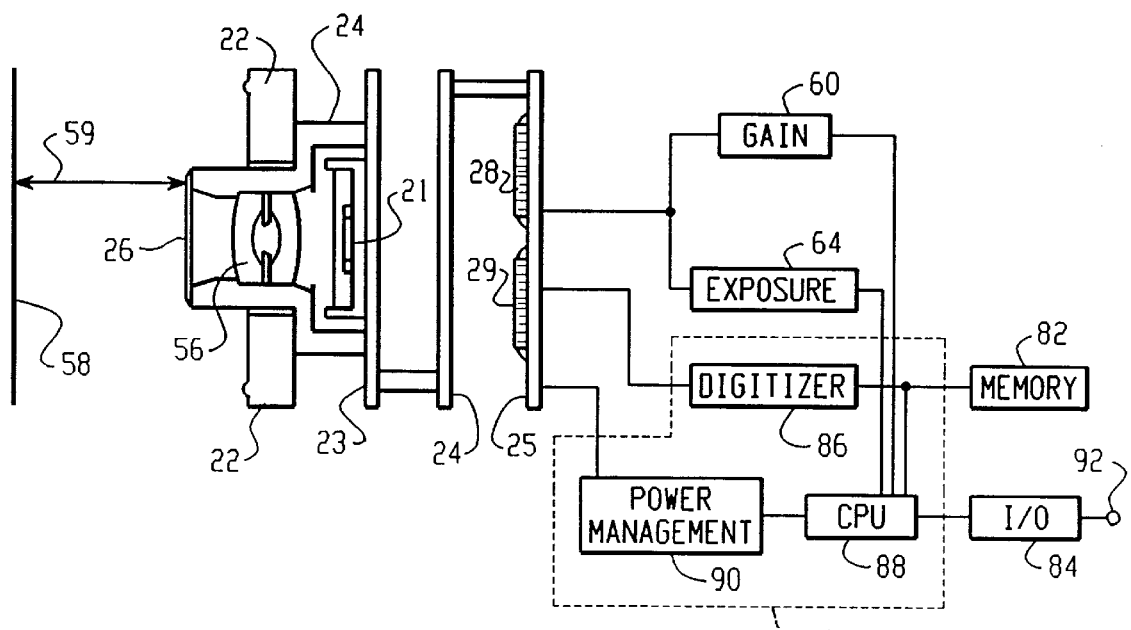
Fig. 3

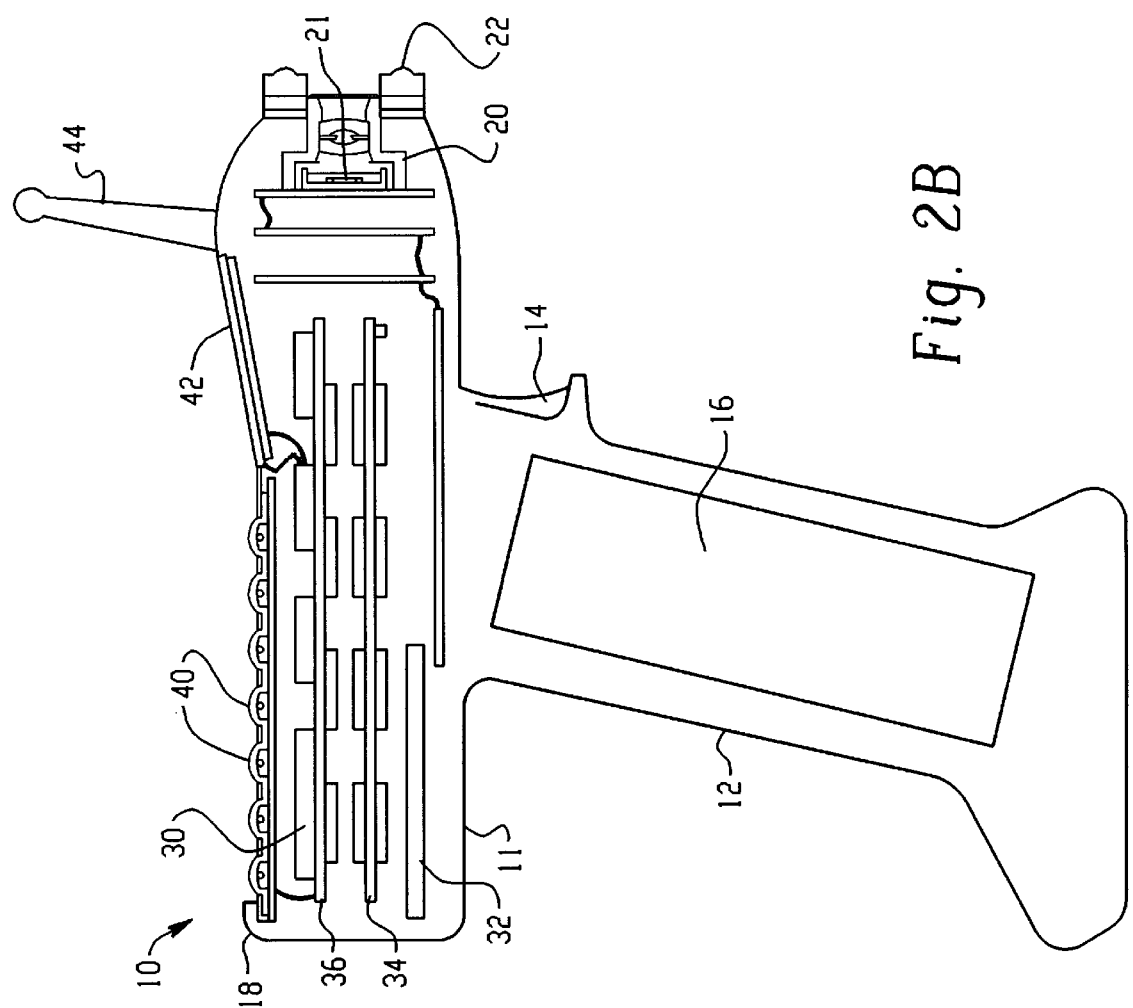
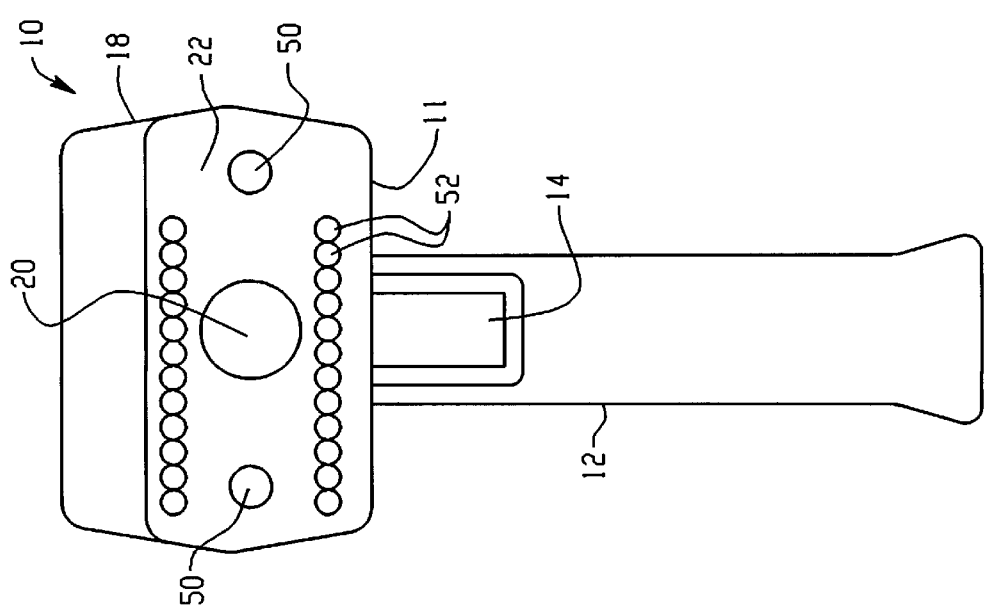
Fig. 2B
Fig. 2A

SUB-PIXEL DATAFORM READER WITH DYNAMIC NOISE MARGINS

The invention relates to methods for reading dataforms, such as bar codes and matrix codes. More particularly, the invention relates to methods for processing image data to locate dataform cell edges by whole pixel processing or by sub-pixel processing with increased resolution by use of a selectively applied noise threshold or margin.

BACKGROUND OF THE INVENTION

The applications and uses of bar codes and matrix codes are well known and increasing. Bar codes and matrix codes are forms of "dataforms", which for purposes of the invention are defined to include all arrangements whereby data is fixed in some form of machine readable copy. Thus, dataforms include one and two dimensional bar codes, matrix codes and graphic codes, as well as words and numbers and other symbols, which may be printed or etched on any suitable medium. Dataforms are utilized to encode information which may be recovered for further use in a variety of manners. For example, a printed bar code may be optically scanned to derive reflectance values which are digitized, stored in buffer memory and subsequently decoded to recover the data encoded in the bar code.

Regardless of the particular type of dataform, an image is typically acquired and stored as pixel values for further processing. An image of a bar code or other dataform existing as a graphic image can be acquired by use of a CCD scanner, laser scanner, sensor array or other suitable arrangement which is capable of distinguishing between different levels of illumination reflected from the dataform. In a bar code for example, the graphic image generally comprises cells of contrasting reflectivity (e.g., black bar type elements printed on a white background, with white spaces between the bars). In the stored image the pixel values thus represent illumination level changes of reflected light ("light" being defined as encompassing the entire electromagnetic spectrum for present purposes). The illumination level changes may typically be stored as pixel values in an image buffer memory or other storage medium in bit map or other form which, while representative of pixel values for an image, may utilize any appropriate data storage format.

For dataform readers, the resolution capability, and thereby the cost of the scanning device or other sensor, as well as the data storage medium, are directly dependent upon the resolution required in the overall decoding process. On a basic level, the resolution characterizing both the pixel data image acquisition and storage must be adequate to permit detection of the position of the smallest image element of interest in the dataform. For present purposes, the bars or other elements utilized in encoding of a dataform are termed "cells" and the smallest image element of interest is termed a "module". The narrowest cell or bar of a bar code will thus be one module wide. If, for example, the width of a module is many times larger than the size of a pixel within the acquired pixel image, it will be appreciated that such module width will be represented by many pixels and its position will be correspondingly easy to detect. Thus, the resolution, which may be measured in pixels-per-module, will be related to the minimum cell width. Conversely, it should be also recognized that if a module dimension is smaller than the size of one pixel in the pixel data image, it will not be possible to detect cell positions with accuracy adequate to enable reliable recovery of data encoded in the dataform. As the size of the smallest image element or cell of interest can be very small within complex dataforms such as 2D bar codes and matrix codes, there is a need to detect the precise location of cell edge transitions with accuracy adequate to enable reliable recovery of all data encoded in the dataform. At the same time, there is a conflicting need to avoid the cost, size and power requirements of higher resolution imaging devices, storage devices, etc.

In the present state of the art, there typically is a requirement that the width of a cell must be no smaller than the dimension represented by two side-by-side pixels in the pixel image. This is another way of expressing a current state of the art standard for bar code decoding, which holds that detecting of a bar code or other dataform requires, at minimum, at least two pixels-per-cell along one axis. This state of the art minimum requirement is further discussed and illustrated in application Ser. No. 08/245,613 filed May 19, 1995, and commonly assigned herewith. FIG. 1A, shows bar code cells and the pixels size relationship for a few pixels within an overall image. The individual pixels may be in any lateral positioning relationship with the bar code cells, and the provision of at least two pixels-per-cell enables determination of the relative cell positions adequately for decoding. For the two-dimensional case (as for cells of a matrix code dataform, wherein both lateral and vertical positioning of square cells are employed for encoding data) detecting typically requires, on a consistent basis, a resolution of at least two pixels-per-cell along two perpendicular axes, which equates to four pixels-per-cell, as illustrated in FIG. 1B. To achieve the desired decoding resolution, the storage or memory medium must have at least the same resolution capability of storing at least two pixels-per-cell for one axis and four pixels-per-cell for the 2D case. These standards, together with the overall size and the image cell content of a complete dataform to be decoded, determine the overall size, resolution and cost of the sensor unit and storage medium necessary to acquire and store the pixel data image. As a result, as dataforms increase in complexity even larger sensor and storage capacity is required. There is thus a need for reliable methods of locating dataform cell edges which are usable with image resolutions better than two pixels-per-cell along one axis in the dataform. Such methods can save both sensor and storage cost and capacity.

An important consideration is the effect of noise on achievable resolution in reading and decoding dataforms. As is known, spurious effects relating to printing or surface variations in a dataform, or to lens, sensor or other optical variations, as well as to electrical signal variations, typically introduce variations in recorded gray scale values. As a practical matter, in the presence of noise each gray scale value may be distorted by being changed to a higher or lower value. If image data stored in memory for a particular dataform were known to include noise variations to a specific maximum magnitude, spurious results could be excluded by ignoring all gray scale value variations smaller than a noise threshold or margin determined in view of such specific maximum magnitude. However, the stored image data may also include valid dataform information represented by small gray scale value differentials. By setting a noise margin adequate to avoid effects of the noise, valid dataform information would, therefore, be lost with the noise. Such loss of dataform information will be reflected as a loss of resolution, limiting the processing of fine detail in dataform reading and decoding. There is thus a need for improved dataform operation to increase achievable resolution in the presence of noise.

Existing edge detection methods available for use in dataform readers rely upon a variety of approaches to locate the edge transitions of cells within the dataform. Commonly used methods employ fixed threshold, residual (original signal minus a low-pass filtered version of the signal) or other algorithms such as Laplacian or Gaussian algorithms to locate the signal transitions. The fixed threshold technique is limited in detection of edges when the contrast of narrow bar code patterns is reduced by convolution and sampling effects introduced during image capture. Other algorithms are similarly not efficient when implemented digitally and may be limited to the at least two pixels-per-cell resolution requirement along an axis. The other techniques in general require filtering operations which in turn require excessive multiplication or other processing operations. There may also be limitations as to the permissible range of cell width variations, due in part to the use of a fixed set of filter parameters which can not readily be changed. The result is to limit one or more of achievable resolution, efficiency of operation and flexibility of performance of available dataform decoders.

In view of the foregoing, objects of the present invention are to provide improved methods of locating dataform cell edge transitions which are characterized by one or more of the following capabilities:

higher resolution performance in the presence of noise;

improved sub-pixel resolution for location of dataform cell edge transitions with reduced imaging and storage resolution requirements;

selective application of a noise margin to image data represented within different gray scale ranges;

automatic determination of a noise margin;

automatic selection of sub-pixel image processing on an as-required basis; and use of whole-pixel image processing when sub-pixel processing is not required for dataform decoding.

SUMMARY OF THE INVENTION

A dataform includes high reflectance regions and low reflectance regions. Therefore, when imaged onto a photosensor array, the gray scale value of each pixel should basically be very high or very low. However, if the pixel is on a border between a high reflectance area and low reflectance area, the gray scale value will be a gray or intermediate value due to convolution effects.

Pursuant to the invention, a noise margin is determined based on the level of noise present in stored image data. Then, if the difference in gray scale value between two adjacent peak and trough pixels is less than the noise margin and both values are high or both values are low, the difference is attributed to noise. However, if the difference is small, but at least one of the values is a mid-range gray scale value (indicating that a pixel is on a cell edge), the small difference is considered to represent a valid edge transition.

In accordance with the invention, in a dataform reader a method of locating dataform cell edge transitions in a reflected image of a dataform which includes high and low reflectance regions, includes the following steps:

(a) acquiring a sequence of gray scale values for pixels representing a first sampling line crossing at least a first cell edge transition of the reflected image, and wherein such high and low reflectance regions are represented within a high range and a low range of gray scale values respectively;

(b) selecting a transition segment having a segment magnitude between adjacent peak (local maximum) and trough (local minimum), or vice versa, gray scale values of the sequence;

(c) determining whether the transition segment meets one of the following criteria: (i) segment magnitude exceeds a noise margin; and (ii) at least one of the adjacent peak and trough gray scale values is within a mid-range between the high and low ranges of gray scale values; and (d) once it is determined the transition segment represents a valid cell edge transition meeting at least one of the step (c) criteria, locating the first cell edge transition along the first sampling line may be accomplished by:

(i) determining a transition point along the transition segment as a function of the adjacent peak and trough gray scale values by application of a Gaussian convolution model; and (ii) locating the first cell edge transition along the first sampling line at a point corresponding to the transition point.

For decoding a dataform, such method may additionally include the steps of:

(e) repeating steps (b) through (d) for a second and further cell edge transitions along the first sampling line;

(f) repeating steps (a) through (e) for a second sampling line;

(g) constructing run length data representing cell edge transitions along the sampling lines; and (h) utilizing the run length data to decode at least a portion of the dataform.

Also in accordance with the invention, in a dataform reader a method of locating dataform cell edge transitions in a reflected image of a dataform, with selection between sub-pixel and full pixel processing, includes the steps of:

(a) acquiring a sequence of gray scale values for pixels representing a first sampling line crossing at least a first cell edge transition of the reflected image, and wherein high and low reflectance regions values are represented within a high range and a low range of gray scale values respectively;

(b) utilizing histogram analysis of sampled image data to determine whether sub-pixel processing is necessary;

(c) upon determining that sub-pixel processing is necessary, carrying out steps (c)(1) through (c)(3) as follows:

(c)(1) selecting a transition segment having a segment magnitude between adjacent local maximum and local minimum gray scale values of the sequence;

(c)(2) determining whether the transition segment meets one of the following criteria: (i) segment magnitude exceeds a noise margin; and (ii) at least one of the local maximum and local minimum gray scale values is within a mid-range between the high and low ranges of gray scale values; and (c)(3) if the transition segment meets at least one of the step (c)(2) criteria, locating the first cell edge transition along the first sampling line by use of the transition segment;

(d) upon determining that sub-pixel processing is not necessary, carrying out steps (d)(1) through (d)(3) as follows:

(d)(1) selecting a transition segment having a segment magnitude between local maximum and local minimum gray scale values of the sequence;

(d)(2) determining whether the segment magnitude exceeds a noise margin; and (d)(3) if the segment magnitude exceeds the noise margin, locating the first cell edge transition along the first sampling line based on the location of the transition segment between the local maximum and local minimum gray scale values (e.g., at the mid-point of the transition segment).

Methods in accordance with the invention may also include:

determining whether sub-pixel processing is required on the basis of the presence in the reflected image of dataform cell dimensions represented at less than two pixels-per-cell nominal resolution;

determining an applicable noise margin by use of histogram analysis to estimate the magnitude of noise present in a sequence of gray scale image data and setting the noise margin at a level at least equal to the estimated noise magnitude; and determining borders of high and low gray scale ranges so that the high range includes all gray scale values representative of illumination reflected from white portions of the dataform (e.g., the highest gray scale values represented in the reflected illumination) and the low range includes all gray scale values representative of reflection from black portions (e.g., the lowest gray scale values present).

For a better understanding of the invention, together with other and further objects, reference is made to the accompanying drawings and the scope of the invention will be pointed out in the accompanying claims.

BRIEF DESCRIPTION OF THE DRAWINGS

FIGS. 1A and 1B are illustrations useful in describing prior art resolution requirements.

FIGS. 2A, 2B and 2C are respectively front, side and top perspective views of a hand-held dataform reader according to a first embodiment of the invention.

FIG. 3 is a block diagram of portions of the dataform reader as shown in FIG. 2.

DESCRIPTION OF THE INVENTION

Specific embodiments of the invention will be described following overall description of a configuration of a hand-held dataform reader.

Figure 2C:
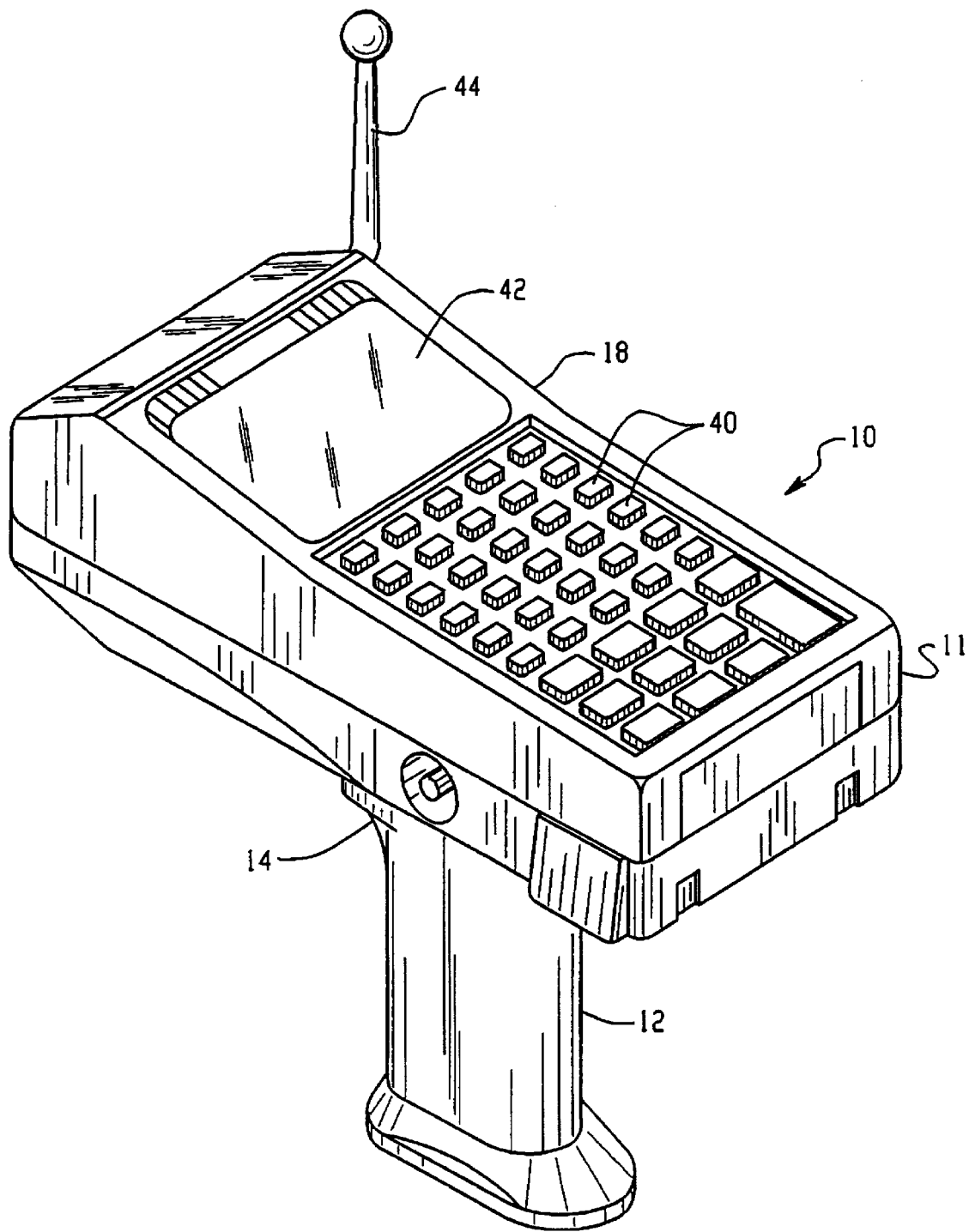

An embodiment of a hand-held dataform reader utilizing the invention is illustrated in FIGS. 2A, B and C. FIG. 2A is a front conceptual view of the dataform reader 10 and FIGS. 2B and 2C are corresponding side and top perspective views, respectively. A portion of the upper casing is removed in FIG. 2B to provide a simplified view of internal components. As shown, the reader includes a suitable impact-resistant plastic housing or case 11 having a handgrip portion 12, a trigger device 14 and battery compartment 16. The dataform reader also includes an upper enclosure portion 18 which, as illustrated in simplified form in FIG. 2B, may include an optical imaging system 20 and an illumination system 22, with various embodiments thereof to be described in greater detail. FIG. 2B also depicts a processor and memory unit 30 and an input/output (I/O) unit 32 which may take the form of a pluggable circuit board inserted into slots from the rear of the reader 10. Additional slots may be utilized to provide additional or extended operating capabilities by enabling insertion of PCMCIA type cards, etc. As illustrated, described components are coupled to printed circuit substrates 34 and 36 intercoupled by flexible wiring 38 arranged for efficient product assembly. As further depicted in FIGS. 2B and 2C, the dataform reader 10 may include a data entry keyboard 40, a display 42 and an antenna represented at 44. Reader 10 is configured to read a dataform (such as a 2D bar code) existing in a target area positioned at a distance from the dataform reader. Thus, for example, a bar code can be printed on a label affixed to a package, component or the like, and the dataform reader held by an operator, with the front of the reader at a distance from the bar code.

As shown in FIG. 2A, the reader 10 in general includes an array of illumination sources comprising illumination system 22. Target illuminators, such as shown at 50, are preferably formed in conjunction with a separate housing which also supports an array of exposure illuminators 52 for brightly illuminating a target area in which a dataform is positioned. The exposure illuminators 52 are designed to provide a substantially uniform level of illumination over the target area when turned on during an exposure period for the purpose of capturing an image of the dataform in the sensor array. The illumination system 22 illuminates the target area to cause reflection of light from the target area which is captured by the optical imaging system 20. The optical imaging system is designed to capture reflected light from the target area and any included dataform and focus it on a sensor array 21 forming a part of system 20. System 20 and related components will be further described with reference to FIG. 3.

Referring now to FIG. 3, there is shown a simplified block diagram of portions of the dataform reader utilizing the invention. A conceptual cross-sectional view of the optical imaging system 20 and flexibly interconnected circuit substrates 23, 24 and 25 is included. Both the optical imaging system 20 and illumination system 22 may thus be formed as separate components which may be plugged in or retrofit into an existing dataform reader to replace another type of other types of illumination and sensor devices. For example, the optical imaging system 20 may produce an output image signal emulating the image signal of a laser scanner to allow system 20 to be simply plugged into a laser scanner housing to function as a 2D dataform reader. As illustrated, the illumination system 22 is disposed outside of the housing supporting other components of the reader 10, and does not transmit light through the optical imaging system 20. The optical imaging system 20 includes a lens assembly 56 having at least one optical lens. The lens assembly is designed to capture light rays reflected from the target area at 58 to form an image of the dataform on a sensor array 21. An optical filter 26 may be used to filter unwanted portions of the ambient light spectrum to reduce effects of ambient light during the exposure period. A sensor array control unit 28 and an associated clock device 29 or other circuits coupled to substrates 23–25 are used to form an output image signal from system 20. A preferred optical system suitable for use with the invention is shown and described in application Ser. No. 08/494,435 referred to above, which is hereby incorporated by reference.

The sensor array 21 may include a two-dimensional array of sensing cells (each utilizing a photodiode and responsive to incident reflected light). Sensor array control unit 28 may typically include readout circuitry, devices for sensing charge or voltage appearing at individual sensing cells, and an output amplifier device with adjustable gain for coupling image signals from the sensor array 21. Clock device 29 may provide timing control of the reading of image signals from selected sensor elements. In the present invention, the preferred embodiment may use a 2D CCD sensor array for capturing an image of the dataform.

In use, the dataform reader is positioned relative to the target area 58 at a distance 59, with the optical lens assembly 56 focusing light reflected from the target area 58 onto the sensor array 21. The reader 10 may optionally include an in-focus sensing arrangement responsive to predetermined image signals to automatically initiate a dataform reading session, as further described in applications Ser. No. 08/280, 489 filed on Jul. 26, 1994 and Ser. No. 08/332,592 filed on Oct. 31, 1994, and commonly assigned herewith. An exposure control device 64 responsive to image signals from one or more selected sensor elements of sensor array 21 may be arranged to provide "start" and "stop" signals useable for beginning and terminating an exposure period. A gain control device 60 may be provided to respond to image signals provided from one or more of the sensor elements of an array 21, and more particularly to the level of reflected light represented by such image signals, to control image signal amplification. The gain control device 60 is thus effective to maintain the amplitude of the image signals provided by the sensor array 21 within a predetermined range, substantially independently from reflected ambient illumination, as represented by amplitude levels of selected image signals.

As illustrated, the reader 10 includes a processing unit 80, memory unit 82 and input/output (I/O) module 84. Processing unit 80, which may include a digitizer 86, CPU 88, and power management module 90, receives image signals from sensor array assembly 20, via circuit substrate 25, and provides image data in digitized form for storage in memory unit 82. Unit 80 is responsive to signals from units 60 and 64 to control the exposure period. An operating sequence may be controlled by processing unit 80 to couple battery power via the power management module 90 to circuit substrate 25 to selectively turn on the targeting illuminators and the exposure illumination system, and to control operation of the sensor array 21 and associated circuitry at selective times to conserve battery power. Processing unit 80 can also be arranged to implement decoding of a dataform using image data stored in memory unit 82. Upon successful decoding of the dataform, unit 80 also provides an end cycle signal effective to terminate a decoding operation and also to end the reading of sensor elements providing image signals. In this configuration, decoded dataform information is provided to an output device 92, via I/O module 84. The I/O module 84 may be arranged to operate with PCMCIA cards in interface slots as discussed with reference to FIG. 2B, and may be arranged to provide radio, infrared, wired or other signal transmission and reception capabilities. Output device 92 may accordingly be an output port for coupling output signals via a conductor, an antenna or optical device for radio or infrared transmission, or other suitable device, with I/O unit 84 arranged to provide the decoded dataform information in suitable form for use with the particular form of output device. Modem, speech recognition, handwriting recognition, memory and other types of additional capabilities or peripheral cards may also be inserted in PCMCIA slots for operation in cooperation with processing unit 80 and I/O module 84 to provide other features.

A dataform reader generally similar to that of FIGS. 2A B and C and FIG. 3 and the operation thereof are described in greater detail in applications Ser. Nos. 08/280,489 and 08/332,592, referenced above.

Specific Embodiments

Figure 4:
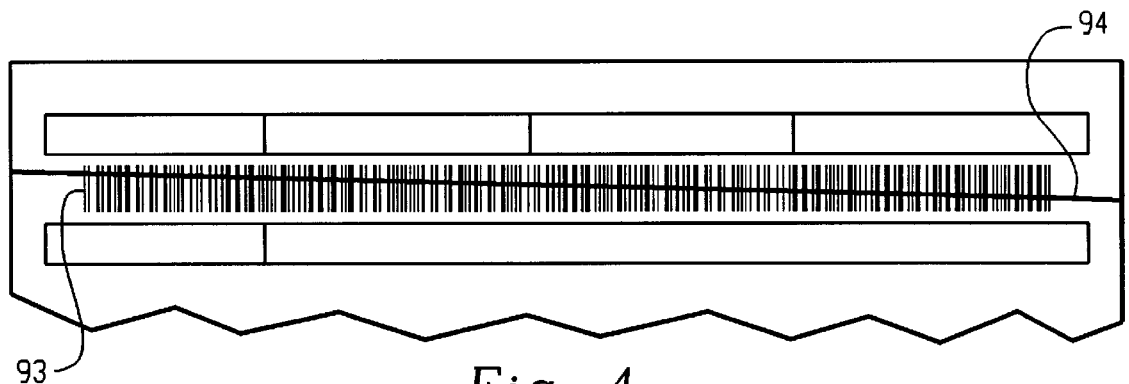
FIG. 4 is a view of a pixel data image of a dataform.

Referring now to FIG. 4, an image stored in a sensor array is represented at 92, with an included image of a dataform at 93. For a very wide, complex form of dataform as shown, individual elements of the dataform have very small dimensions when the entire dataform is imaged onto the sensor elements of a sensor array, as shown. As noted, previous readers have generally required a resolution characterized by the smallest cell dimension of the dataform (i.e., one module) being at least two pixels wide (e.g., not smaller than the width of two side-by-side sensor elements) in order to enable location of cell edges accurately enough for successful dataform decoding. On this basis, for a typical CCD sensor array 256 sensor elements wide the maximum width of a decodable bar code would be limited to 128 modules. Individual cells of the bar code will be one or more modules wide, so that the prior practical limit for a bar code will be significantly less than 128 bar and space elements for this size CCD array. As will be described, the invention provides sub-pixel processing effectively increasing resolution for a CCD array of given size by reducing the minimum pixel-per-cell requirement from at least two, to between one and two, pixels per minimum cell width (per module).

Figure 12:
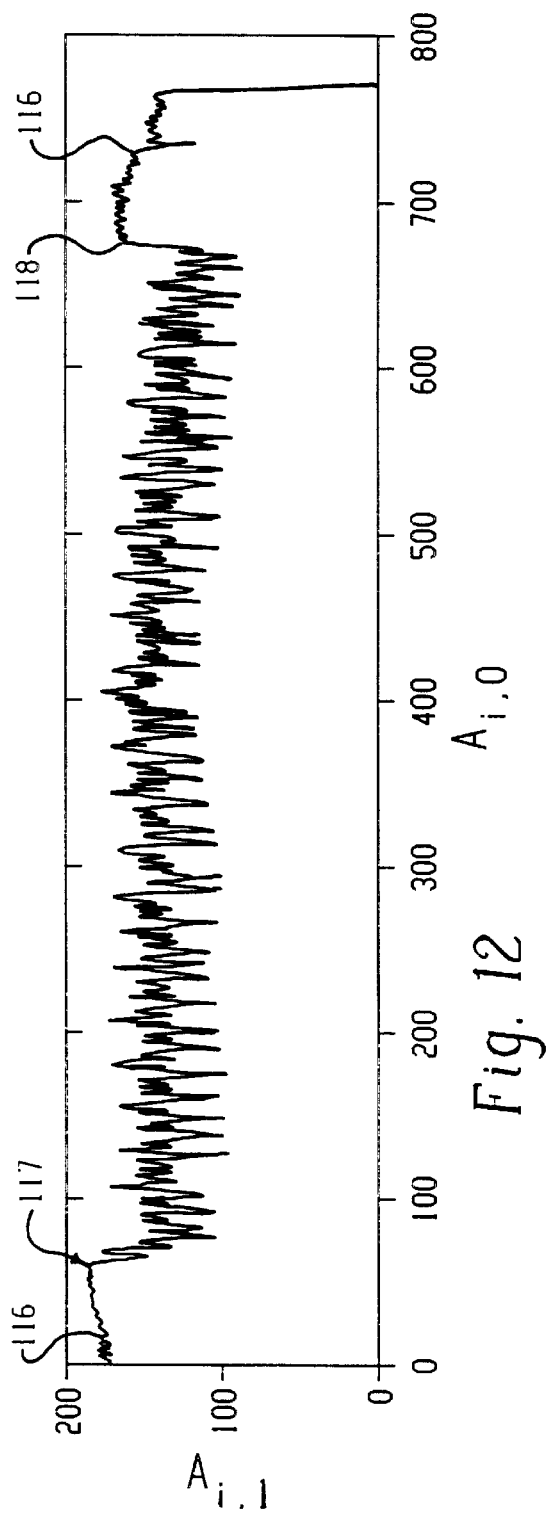
FIG. 12 is a plot of the gray scale values for pixels along a sampling line crossing cell edge transitions of a dataform.

Once image 92 is stored by the dataform reader of FIG. 3, CPU 88 operates to provide run length data for the dataform for decoding, as will be described. For purposes of the invention "run length data" is defined as a representation of a sequence of cell edge transitions or dimensions of all or a desired portion of the cells of a dataform in a form usable for dataform decoding (as will be further discussed with reference to FIG. 23). The dataform image is processed by analysis of a plurality of sampling lines each represented by a sequence of gray scale values for pixels along a line crossing cell edge transitions of the dataform image. While laser scanners and other devices (as well as presently preferred CCD sensor arrays) may be used to provide image data, reference will be made to "sampling" lines for selection of such a sequence of gray scale values. A sampling line is indicated at 94 in FIG. 4. In a preferred embodiment the method of locating dataform cell edge transitions is usable with a range of dataform cell widths from sub-pixel width to much wider widths, with automatic selection between the alternatives of sub-pixel or whole pixel processing. Increased capability in dataform reading results from providing sub-pixel accuracy or resolution in locating cell edge transitions. Pursuant to the invention, operation also adapts to a wide range of noise conditions affecting pixel data. Provision is made for identifying pixels defining a sampling line so that a sequence of gray scale values can be sampled along a selected line. FIG. 12 shows a sequence of gray scale values along a sampling line crossing a dataform (e.g., line 94 of FIG. 4).

With reference to FIG. 12, it will be appreciated that while the illustrated gray scale values represent a sequence of cell edge transitions, the large number and small width of individual cells in the presence of noise effects increases the difficulty of accurately locating the actual cell edge transitions. Thus, the dataform may be a 2D bar code printed on a surface as a graphic image of black (low reflectance) and white (higher reflectance) vertical bar elements. Each bar, whether black or white, can be the width of one or a plurality of basic module or element widths (a single module or cell width thus representing the smallest dimension of interest). Data is encoded into the bar code, as represented by the graphic image, by selection of the widths of successive black and white elements and noise effects are introduced by printing, ink and surface irregularities, as well as the nature and characteristics of the reflected illumination and the focusing and illumination detection devices.

As will be described in greater detail, the dataform reader converts the sequence of gray scale values representing pixels along a sampling line into run length data usable to decode cells of the dataform. By use of dynamic noise margins and data selection subject to designated noise margins, improved dataform cell edge location is achieved even in the presence of noise.

Initially, image data including a representation of a dataform is stored in memory 82 of the FIG. 3 dataform reader, based on a reflected image focused on sensor array 21, as described above. It is then desirable to utilize the stored image data to acquire gray scale values for pixels representing a desired sampling line crossing the dataform image. In general, the stored data will not be representative of a dataform which has its horizontal axis horizontally aligned within the image area represented by the stored image data. Basically, the dataform reader can be used to read a dataform having an arbitrary orientation within a target area and the dataform image may thus have any orientation within the image focused on the sensor array. Desirably, however, a sampling line for present purposes would be aligned so as to cross all (or at least a plurality) of the bars of a particular row included in a 2D bar code, for example.

Figure 5:
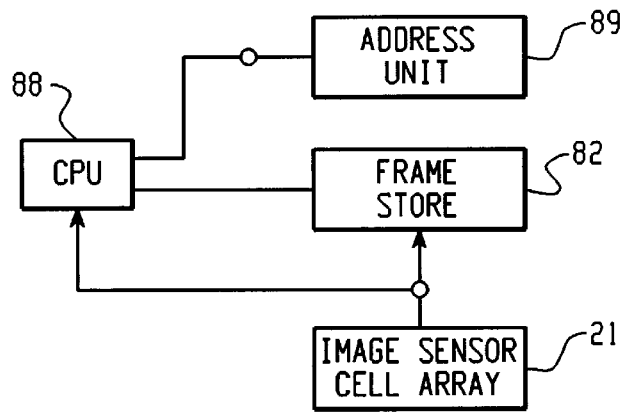
FIG. 5 is a block diagram of a processing unit in accordance with one aspect of the invention.

Referring now to FIG. 5 there is shown a simplified block diagram of a portion of the FIG. 3 reader which additionally includes address unit 89. The FIG. 5 configuration provides the capability of accessing image data stored in frame store memory 82 for a sampling line aligned at any angle so as to cross the cells of a dataform to provide a sequence of gray scale values as referred to above. As represented in FIG. 5, CPU 88 is arranged to operate with a variety of types of software programming. Such software may include (a) programs suitable for locating bar codes, (b) run line programs for identifying start and stop points of an oblique line component, the start point and inclination angle or slope of an oblique line component, or combinations of points and slopes and (c) one or more programs for decoding bar codes or other types of dataforms from image data representative thereof.

Bar code location provided as described in commonly assigned U.S. Pat. No. 5,304,787 can thus be arranged to provide location signals for the four corners of a bar code located within an image stored in frame store 82, together with information as to the actual orientation of the bar code within its bounding box. In FIG. 5, CPU 88 is arranged to provide signals identifying sampling lines for which image data is to be read to provide a sequence of gray scale values. These signals may comprise data identifying the start and stop points of oblique lines, the slope of such oblique lines, or combinations of such points and slopes. For present purposes, "oblique" lines are defined as lines positioned obliquely to the rows and columns of sensor elements of an array. Address unit 89 is responsive to such data from CPU 88 to generate address signals sequentially addressing each pixel or sensor cell position defining the oblique line component as identified by CPU 88. As will be described further with reference to FIG. 6, such address signals are effective to identify a stepped pixel pattern of sensor cells representative of the oblique line component. This capability of using stepped pixel patterns enables image data to be read out along oblique line components selected to extend along rows of elements of a dataform traversing the elements in a direction substantially perpendicular to the elements. The address signals may have the form of memory address signals usable to access stored image data originating from sensor cells comprising a stepped pixel pattern. Such signals are coupled from address unit 89 to frame store 82 in order to sequentially address the memory location of the stored image data originating from sensor cells representing each pixel of the stepped pixel pattern for the desired oblique line component of the stored image. The image data from the selected memory locations is then provided to CPU 88 for further processing, which may include decoding of the bar code.

Figure 6:
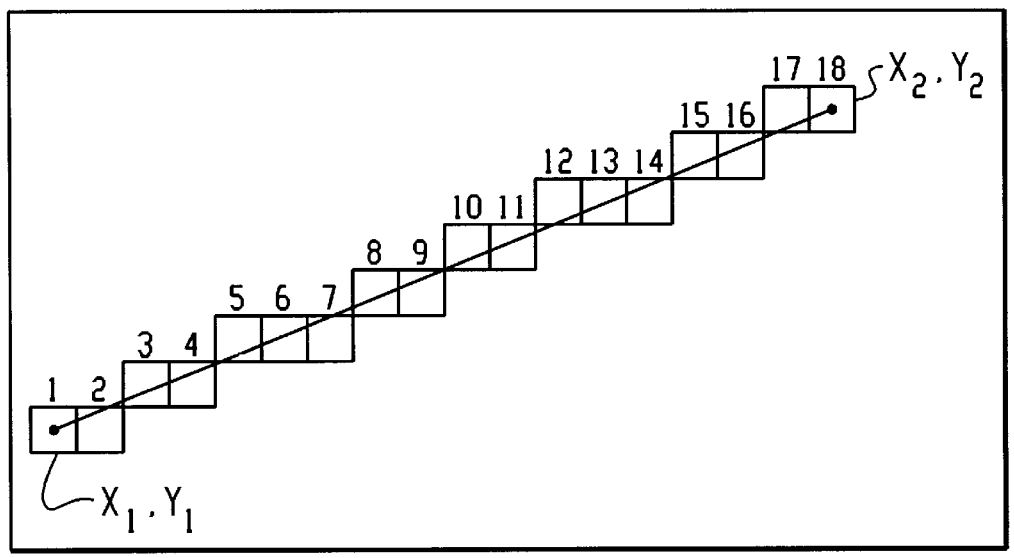
FIG. 6 shows pixel elements of a sensor array long a sampling line.

In operation of the FIG. 5 system, start and stop points of an oblique line component of an image portion segment are initially provided based upon data from a bar code locator or other source. The system will operate equally as well for oblique lines as for lines which are not oblique (i.e., horizontal or vertical lines which coincide with rows or columns of sensor cells in an array). The address unit 89 may have the form of a hardware state machine configured using known techniques so as to automatically generate address signals for pixel positions along an oblique line component of stored image data when provided with appropriate line identification data or values. Such a state machine may comprise a semiconductor device configured to carry out the function of outputting the memory addresses or array addresses of image data for a complete pixel pattern in response to location signals representative of end point coordinates and slope of an oblique line component, for example. The address unit 89 operates in known manner by conceptually first addressing the $X_1, Y_1$ coordinates and then without any further input from the CPU, sequentially addressing each X coordinate and the appropriate Y coordinate (based on the line slope) until it addresses $X_2, Y_2$ where it stops. FIG. 6 graphically shows both an example of a stepped pixel pattern for a sample oblique line component and the order in which pixels are addressed for that oblique line component.

Figure 7:
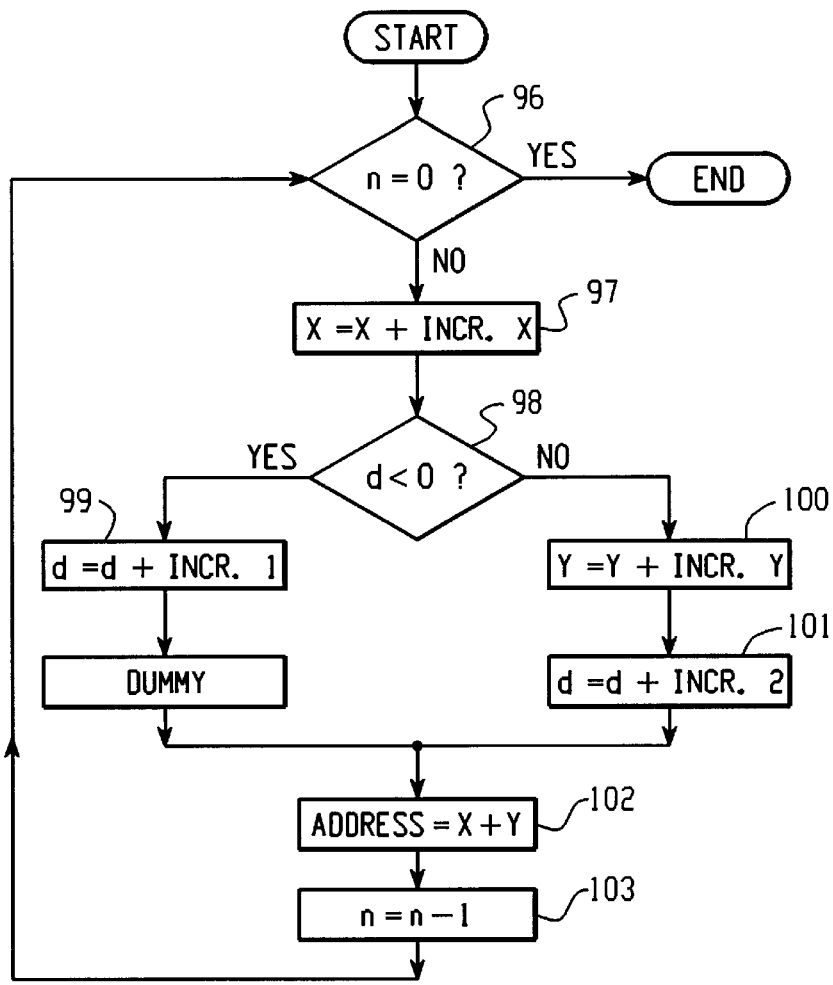
FIG. 7 is a flow chart relating to the method of identifying pixel locations along a sampling line.

FIG. 7 is a flow chart representation of operation of the address unit 89. At step 96 the variable n is a counter that counts the number of cycles necessary to address each pixel on the line. When the counter reaches zero at step 96 all pixels have been addressed and the state machine stops. If n≠0 then, at step 97, X is incremented to the next sequential X value. At step 98 the variable d is a slope counter. With each increment of the value $X_1$ the state machine determines whether the value of Y must also be incremented or stay the same. If the pixels were of infinite resolution, Y would be incremented with each X increment in proportion to the slope of the line. However, as shown in FIG. 6, without infinite resolution, the Y value will not be incremented with each X increment. As described, this state machine does not produce a line in which the Y value is incremented more than once without incrementing the X value. Therefore, in the case where the line has a slope greater than 45 degrees, the X and Y coordinates are simply reversed for processing. If d is less than zero at step 98, the Y value is not incremented, but d is updated for the next cycle at step 99. If d is not less than zero, then Y is incremented at step 100 and d is updated for the next cycle at step 101. After incrementing X and, if appropriate, incrementing Y, the address is X+Y which is sent to the sensor array 16 at step 102. At step 103 the cycle counter n is updated.

Figure 8:
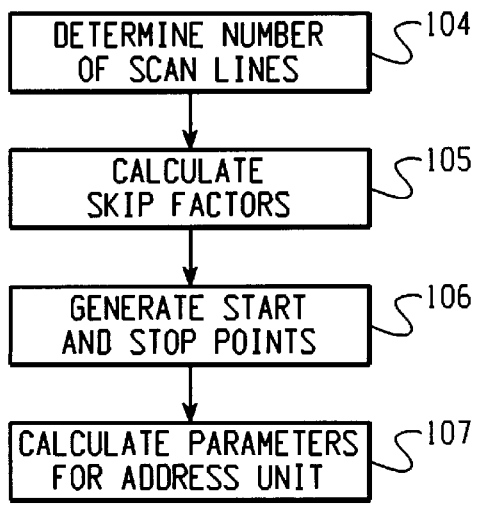
FIG. 8 is a flow chart for setting a sampling pattern in accordance with the invention.

The address unit may be arranged to provide address signals to identify stepped pixel patterns for a complete set of parallel oblique line components in response to a single slope or slope/end point input from the CPU. FIG. 8 is a flow chart that briefly illustrates the operation of run line programming for stop points for a plurality of sampling lines. At step 104, the run line program is used to determine the quantity of sampling lines necessary. This determination can be based on an estimate of the resolution of the dataform utilizing data obtained while locating the bar code. At step 105, the system calculates four skip factors based on the quantity of sampling lines determined to be appropriate. At step 106 the system generates each start point $(X_1, Y_1)$ and each end point $(X_2, Y_2)$ as represented for a single sampling line in FIG. 6.

The parameters needed by the state machine to identify the pixels forming the oblique line component to be sampled are then calculated at step 107. The FIG. 5 system and its operation enabling the acquiring of sequences of gray scale values for pixels representing sampling lines crossing cell edge transitions of a dataform image are described in greater detail with alternative arrangements in application Ser. No. 08/438,889 filed May 10, 1995 and commonly assigned herewith, which is hereby incorporated by reference.

Cell Edge Location

Figure 9:
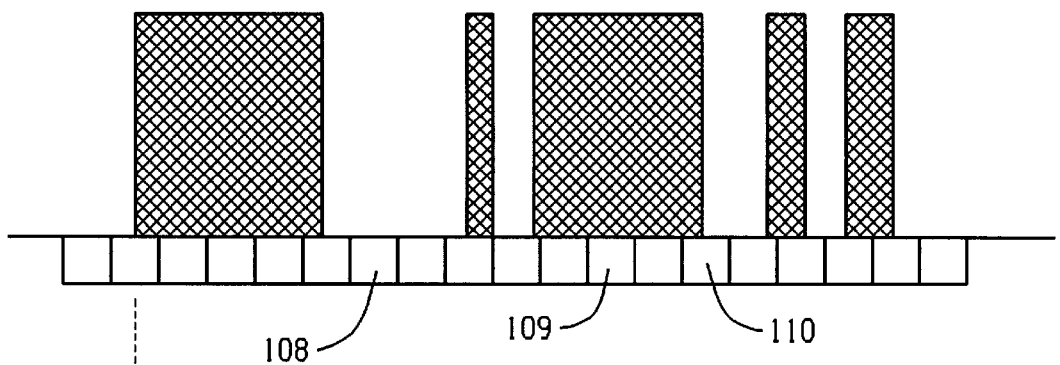
FIG. 9 illustrates a simple series of bar elements with conceptually positioned sensor array elements representing pixels.

For purposes of illustration, FIG. 9 shows a simple sequence of bar cells of a dataform and an adjacent representation of a line of pixel positions or CCD sensor elements upon which a reflected image of the bar cells is focused. It will thus be appreciated that pixel position 108 receives illumination reflected from a high reflectance white region of the dataform, pixel position 109 receives illumination reflected from a low reflectance black region, and pixel 110 receives an intermediate level of illumination from a black/white region representing a cell edge transition. When digitized and stored in memory as gray scale values, pixel position 108 will thus be represented as a high gray scale value, pixel position 109 as a low gray scale value, and pixel position 110 as an intermediate gray scale value.

Figure 10:
FIG. 10 shows a plot of gray scale values for reflection from the FIG. 9 bar elements in the absence of noise.

FIG. 10 shows an ideal gray scale plot of the FIG. 9 sequence of bar cells of a dataform. The FIG. 10 gray scale plot requires sub-pixel processing because, as shown, the smallest cells are much narrower than two pixels in width. In FIG. 10 no noise has been introduced.

In FIG. 9 each cell edge transition represents a transition from black to white or white to black. In FIG. 10 each cell edge transition is represented by a transition segment (illustrated as a line segment) transitioning from a higher gray scale value (e.g., white) to a lower gray scale value (e.g., black) or vice versa. In addition to transitions from black to white and white to black, there are included transitions between higher and lower intermediate gray scale values (e.g., gray to gray) and transitions between gray and white or gray and black gray scale values.

For present purposes, each transition segment can be considered as extending between a local maximum and a local minimum ("local" because the maximum for a given segment may represent an intermediate gray scale value less than white, for example). The local maximum and local minimum thus represent adjacent peak and trough gray scale values and can be in peak to trough sequence, or vice versa. In FIG. 9 there are 10 cell edge transitions. In FIG. 10, in the absence of noise, each of the 10 transition segments represents a valid cell edge transition. As illustrated, each high reflectance space plots as a peak and each low reflectance bar plots as a trough.

Pursuant to the invention, certain characteristics of the gray scale peaks and troughs (maximum and minimum gray scale values) are identified as particularly significant. If a space is wide enough to cover several pixel positions, the peak is wide and flattens at the white gray scale value. Similarly, a wide bar is represented by a wide flat-bottomed trough at the black gray scale value in FIG. 10. If the space is narrower than two pixels wide, then the peak will be narrower than two pixels. More specifically, for narrower spaces the height of the peak may only reach an intermediate gray scale value rather than a white value, as noted.

Figure 11:
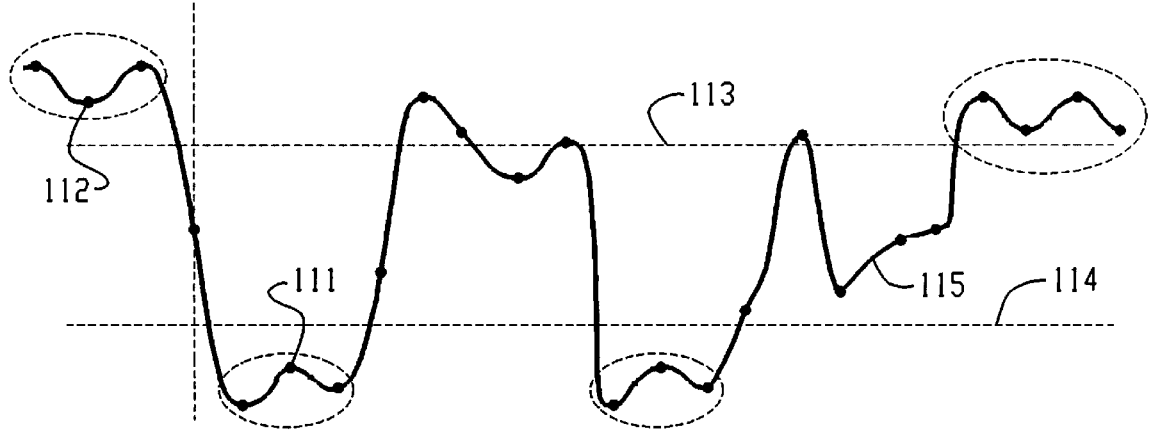
FIG. 11 illustrates the addition of random noise to the FIG. 10 gray scale values.

In FIG. 11, random noise has been introduced to the FIG. 10 plot producing a gray scale plot including 19 transition segments. Since FIG. 9 includes only 10 cell edge transitions, the FIG. 11 transition segments in excess of that number are false transition segments. Resulting characteristics identified in accordance with the invention include the following. First, if a peak (or trough) is more than two pixels wide, there are pixel positions along the top of the peak (or bottom of the trough) whose gray scale value can be changed by noise to result in introduction of false peaks or troughs, or both. A false peak has thus been introduced at 111 and a false trough at 112. Second, if a peak (or trough) is two pixels or less in width, noise can distort the maximum (or minimum) gray scale value but cannot add a new peak or trough. Third, since transition segments representative of cell edge transitions are represented by line segments between successive local maximum and local minimum gray scale values (or vice versa), for peaks or troughs two pixels or less in width noise cannot result in addition of a new transition segment. Also, if there are a series of bars and spaces each one to two pixels wide, each bar and space will plot as a single peak or trough, regardless of the presence of noise or the magnitude of such noise.

In summary, wide dataform cells plot as wide peaks and troughs. For a wide white region of a dataform the peak will extend to the pure white range of the gray scale, subject to gray scale value variations across the wide peak due to noise. Similarly, for a wide black region of a dataform the trough bottom will extend to the pure black gray scale range, subject to noise related variations along the trough bottom. Since cell edge transitions are represented by transition segments between local maximum and local minimum gray scale values, such noise related variations may introduce false transition segments in a wide peak or trough. Pursuant to the invention, it is recognized however that narrow dataform regions plot as peaks or troughs two or fewer pixels wide, to which noise cannot add distortions resulting in any false transition segments. These narrow peaks or troughs may fall at intermediate gray scale values, producing small transtion segments which nevertheless represent actual cell edge transitions.

Thus, it is recognized that false transition segments produced by noise can be present only within high and low ranges of gray scale values. Accordingly, in methods in accordance with the invention a noise margin is applied so that small transition segments present in such high and low gray scale ranges are treated as not representing actual cell edge transitions. The noise margin is not applied to small transition segments where a peak or trough is present in the intermediate gray scale region (i.e., between the high and low ranges). Since noise cannot create false transition segments outside of the high and low gray scale ranges, each transition segment in the intermediate gray scale region is considered an information bearing transition representing a cell edge transition. High and low gray scale ranges for this purpose may be designated on a predetermined or trial and error basis for use with dataforms of a particular type (e.g., having known characteristics). The ranges may also be actively determined by histogram analysis, as will be further described. In FIG. 11 the high range may be considered as extending from pure white to the gray scale value represented by line 113, with the low range from black to the line 114 gray scale value. With these ranges, a noise margin is effective to cause the transition segments emenating from the noise-modified gray scale values 111 and 112 (as respective false local minimum and maximum values) to be treated as false segments, without restricting transition segment 115 from being processed as representing an actual cell edge transition.

Figure 13:
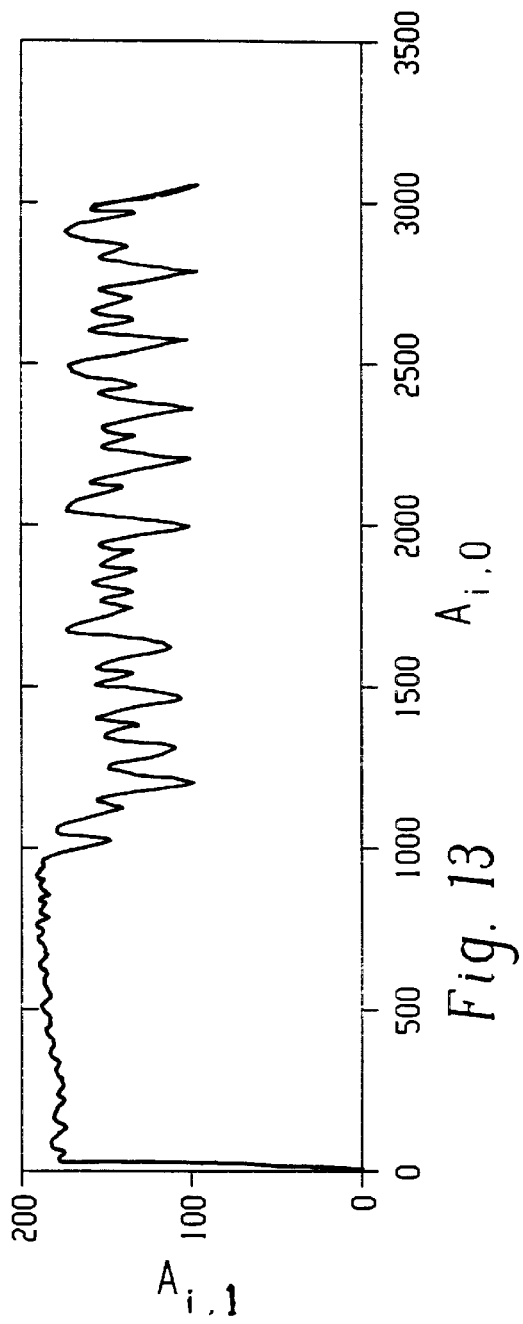
FIG. 13 is a plot of a portion of the gray scale pixel value signals shown in FIG. 12.
Figure 14:
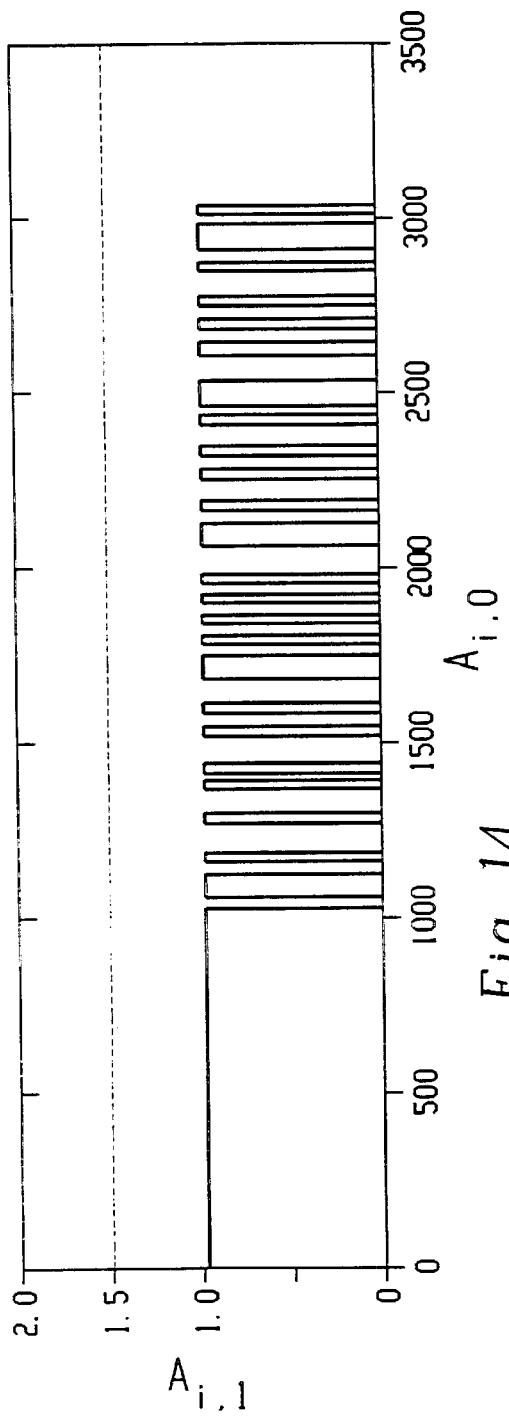
FIG. 14 shows the run-length code generated by the method according to the invention for the portion of the signal shown in FIG. 13.
Figure 15:
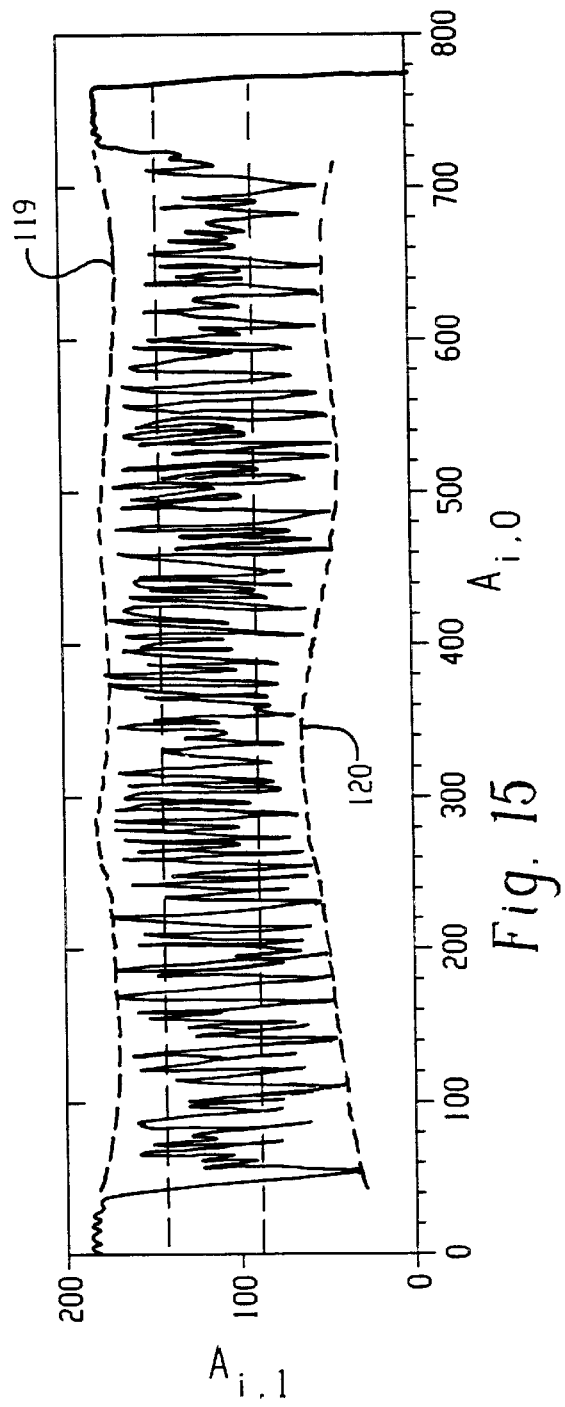
FIG. 15 shows a plot of gray scale pixel values relating to a scan of an image of a complex dataform to be processed by the method according to the invention.

With reference now to FIG. 12, there is illustrated a sequence of gray scale values for pixels representing a sampling line (e.g., line 94 of FIG. 4) crossing cell edge transitions of the dataform image 93 of FIG. 4. In FIG. 15 there are represented gray scale values resulting from reflected illumination levels on individual sensor elements comprising a sampling line as described. Whereas the actual dataform may be a 2D bar code made up of discrete black bars and white spaces, reflective, sensing, processing and other effects result in a "noisy" waveform as shown, which is processed in accordance with the invention in order to locate dataform cell edge transitions as necessary for dataform decoding. Typically, the gray scale values may comprise a scale of from 0 to 255, with 0 representing lowest reflectance (e.g., black element) and 255 representing highest reflectance (e.g., white element). As described, FIG. 12 represents the gray scale values along a single sampling line. It will thus be appreciated that run length data suitable for decoding a complete 2D bar code, for example, must include a sampling line representing the cell edge transitions of each line of bar code elements. In FIG. 12 there are shown quiet zones 116 preceding the start of the bar code image at 117 and following the end of the bar code image at 118. FIG. 13 shows an expanded portion of the FIG. 12 gray scale sequence and FIG. 14 shows a corresponding portion of the run length data constructed by operation of the invention. As shown, FIG. 14 provides a representation of the specific element edge positions, and thereby the relative widths of the elements, in a form suitable for decoding use.

In preparation for cell edge location, parameters relevant to the particular sampling line gray scale sequence are estimated, preferably by analysis of one or more sampling lines at differing orientations in the vicinity of the middle of the dataform image of interest. These parameters may include noise levels present in the gray scale sequence, initial upper and lower signal envelope borders, and dataform module width (i.e., pixels per module). Upper and lower envelope borders are determined as lines which respectively follow on an approximated basis an outline of the maximum value signal excursions and minimum value signal excursions as represented at 119 and 120 in FIG. 15.

The need for sub-pixel edge location accuracy may be evaluated by determining a value representative of the ratio of the size of the smallest dataform element in the image, relative to the size of a photosensor pixel. If such value is below a predetermined number (e.g., 2 or 2:1) sub-pixel processing is employed. Histogram analysis of sampled image data can be utilized to determine the need for sub-pixel edge location accuracy, based on histogram value uniformity characteristics. As will be described further, sub-pixel edge location is generally required if the width of a dataform module, as represented in the stored image data, is smaller than two pixels or smaller than the optical system spot size in the image (sensor) plane. For widths of two pixels per module or greater, the additional processing necessary for sub-pixel accuracy of cell edge location is not required and whole pixel processing can be used. It should be noted that dataform module width is determined not only by original dataform dimensions, but also by convolution and sampling effects resulting from image capture and processing. For determination of the need for sub-pixel edge location processing, histograms of the gray scale gradient between successive gray scale values (maximum to minimum gradients and minimum to maximum gradients) are developed. Typically, for improved reliability of results a few points on the high end of the histogram are discarded or ignored. The remaining histogram buckets are then divided into four groups and a determination that sub-pixel edge location accuracy is needed is made if the histogram is relatively uniform, rather than having a peak at the high end. Known techniques of histogram analysis may thus be employed and automated sensing of histogram uniformity, versus high end peak values, can be adjusted for desired performance in view of results obtained under initial or test conditions. The noise margin is also selected based on statistics as to the successive gray scale gradient histogram. Analysis of the magnitude of noise or spurious effects is evaluated relative to the magnitudes of representative signal gradients for a gray scale representative of one or more initial sampling lines.

Figure 16:
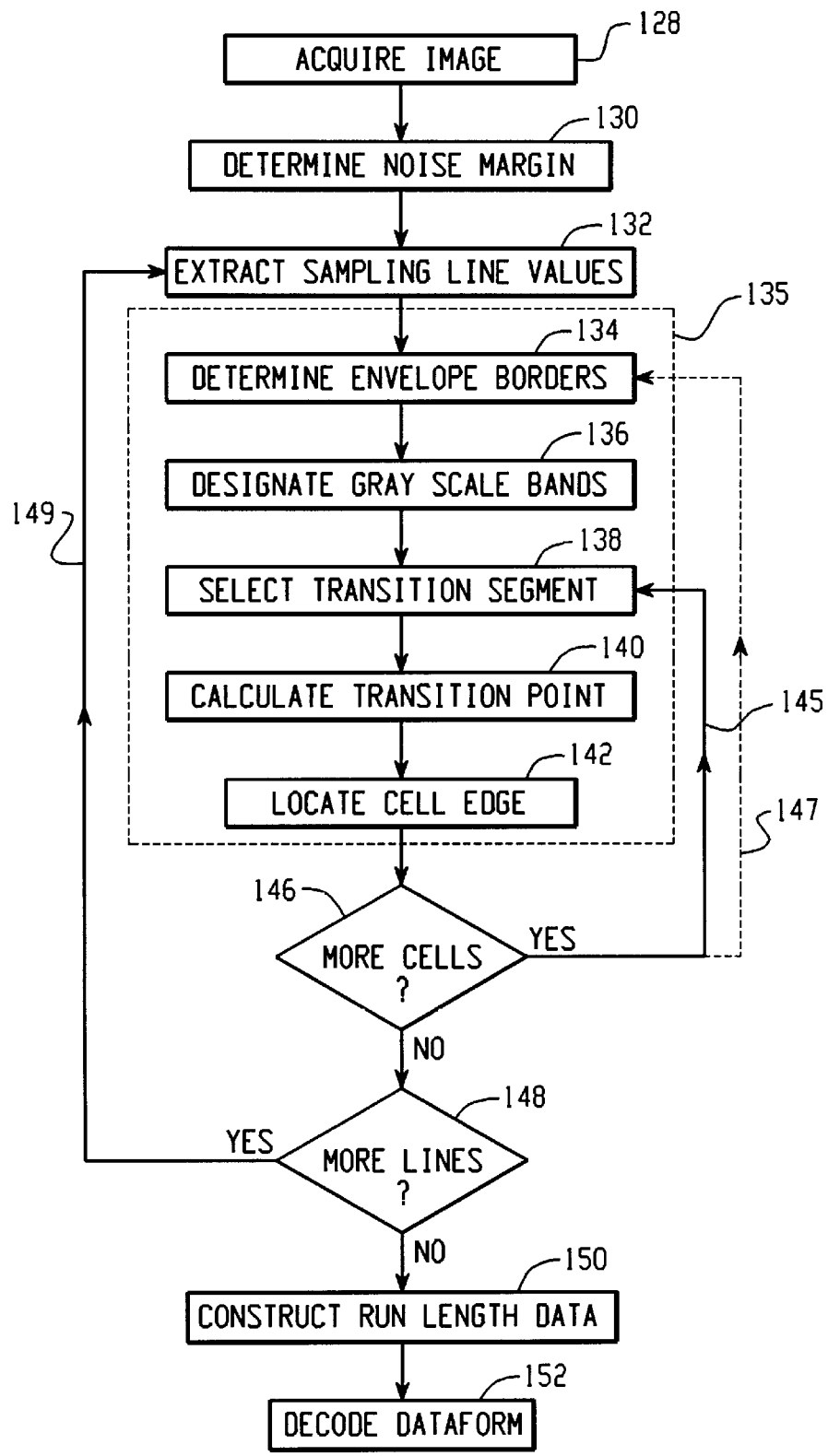
FIG. 16 is a flow chart illustrating steps of a sub-pixel method for locating cell edge transitions in accordance with the invention.

After initial estimation of these selected parameters, either sub-pixel or whole pixel processing is initiated. FIG. 16 is a flow chart useful in describing cell edge transition location methods in accordance with the invention and is particularly illustrative of sub-pixel processing. Following a determination that sub-pixel processing is needed, an image including a dataform is stored at step 128 and the noise margin (and other initial parameters) are determined at step 130. A sampling line of gray scale values as discussed with reference to FIG. 15 is then extracted from the stored image data at step 132. In FIG. 16, steps 134–142 as enclosed within dashed box 135 are particularly applicable to sub-pixel processing. Whole pixel processing in accordance with the invention will be described below with reference to FIGS. 20 and 21.

Figure 17:
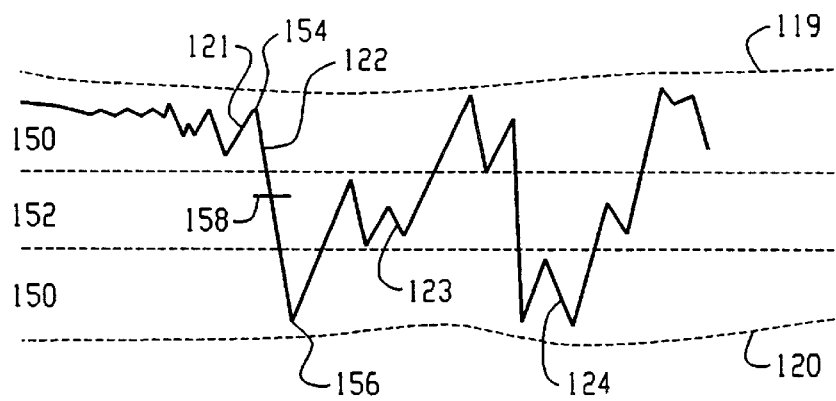
FIGS. 17–19 are gray scale sequence diagrams useful in describing steps of the FIG. 16 method.

At step 134 the upper and lower envelope borders are again estimated and updated for a relevant portion of the sequence of gray scale values for the specific sampling line just extracted. FIG. 17 represents a portion of the FIG. 15 gray scale value sequence on a horizontally expanded scale. In this example the portion is one of a series of window portions comprising the full FIG. 15 sequence. As shown, the upper and lower envelope borders are indicated at 119 and 120. Preferably, a window portion is selected to include gray scale values for a limited number of dataform cells. In this manner, the sampling line will comprise a series of window portions with envelope borders determined individually for each window portion. As a result, the envelope borders are dynamically determined for successive windows, providing higher resolution operation pursuant to cell edge location method in accordance with the invention.

It will be appreciated that a change in level of reflected illumination representing a black to white, or white to black, dataform cell edge will result in a change in gray scale values along a sampling line. FIG. 17 shows a sequence of gray scale values connected by transition segments, representative examples of which are identified at 121, 122, 123 and 124. As already discussed, it has been found that for dataform cells of small dimensions in the presence of noise, small transition segments may represent either actual cell edge transitions or spurious gray level variations attributable to noise effects. Thus, transition segment 122 is large enough not to be attributable to noise. However, transition segments of smaller magnitude, such as those shown at 121, 123 and 124, their magnitude is comparable to the magnitude of spurious effects attributable to noise. Pursuant to the invention high resolution decoding can be achieved in accordance with the invention by utilizing a noise margin to characterize small transition segments occurring at relatively high or low gray scale values as attributable to noise. The noise margin is, however, selectively utilized so that while transition segments such as 121 and 124 are treated as false, transition segments such as 122 and 123 are treated as valid and processed in order to locate cell edge transitions.

More particularly, for the individual window portion of FIG. 17, at step 136 of FIG. 16 the noise margin is implemented by dividing the gray scale range between the upper and lower envelope borders into three horizontal bands. For example, a ratio of 2 to 1 may be used with each of the outer bands 150 twice as wide as the central band 152. With this ratio the width of bands 150 will each be 40 percent and band 152 will be 20 percent of the overall width between the upper and lower envelope borders 119 and 120. As a result, as the width (i.e., range of gray scale values) between the envelope borders changes for different window portions of a sampling line, the widths of the bands 150 and 152 will be dynamically adjusted for each window section during sub-pixel processing. Thus, at step 136 in operation of the dataform cell edge locating method, transition segments such as 121 and 124 which fall within the upper or lower bands 150 are subject to the noise margin and are discarded or disregarded as spurious effects if the transition segment magnitude falls below the noise margin. Transition segments such as 122 which have a magnitude greater than the noise margin are treated as representative of actual cell edge transitions, as are segments such as 123 which are contained within the central band 152. Thus, transition segments falling within one of outer bands 150 are treated as spurious if they fall below the noise margin, but transition segments falling within central band 152 are processed, regardless of magnitude.

At step 138, a first transition segment extending between two successive gray scale values is selected, subject to the step 136 noise margin as implemented in the context of outer bands 150, as discussed. Thus, the transition segment 122 may be selected for purposes of step 138. As shown, transition segment 122 extends between gray scale end point values 154 and 156, which may respectively be referred to as local maximum and local minimum values.

Figure 18:
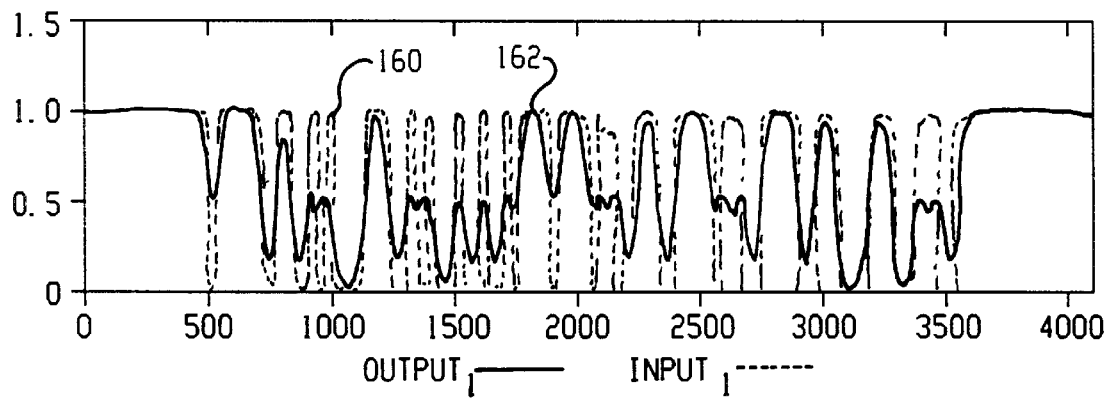

At step 140, an adaptive transition point is determined along transition segment 122 as a function of its end point gray scale maximum and minimum values 154 and 156. The adaptive transition point represents the location of the relevant cell edge transition relative to the inclined length of the transition segment. In accordance with the invention, during sub-pixel processing an adaptive transition point is calculated for each transition segment selected as representative of a cell edge transition. In a currently preferred embodiment, the adaptive transition point for each cell edge transition is calculated based upon a Gaussian convolution model. The gray scale pixel values along a sampling line can be modeled as the samples of an input signal with step edges passing a linear system with a Gaussian impulse response. In FIG. 18, an example of the input and output of a particular sampling line is illustrated, with the Gaussian convolution kernel width (typically designated a) set at 1.1 pixels and the dataform module width (minimum cell width) set at 1.5 pixels. The input signal 160 (dashed lines) results in the output 162 (solid line) upon application of the Gaussian convolution model utilizing known techniques. Application of the Gaussian convolution model may also use integrated or point sampling techniques to obtain the output in a form similar to that shown in FIG. 18. The Gaussian convolution model accounts for convolution of the optical system and sensor, with the model assimilating these components into processing of the gray scale pixel values along the sampling line. For a transition segment representing a valid edge transition, the adaptive transition point in a preferred embodiment may be calculated using the following relationship which fits the Gaussian model:

$$a=8+10*((MAX+MIN)-(U+L))/(U-L)$$

$$T=a* \text{ MIN}+(16-a)* \text{ MAX}$$

Where MAX is the local maximum value, MIN is the local minimum value, U is the upper envelope border value, L is the lower envelope border value, and T is the transition point.

With reference to FIG. 17 local maximum and minimum values for transition segment 122 are indicated at 154 and 156 with the adaptive transition point shown at 158. For a range of convolution kernel widths and dataform module widths of interest, this transition point can be fit into a linear function of the local maximum 154 and local minimum 156 for a single edge, and the minimum and maximum of the output of the dataform elements having the greatest width. In general, the separation width between a pair of rising and falling transition segments representing edges in wider dataform patterns is much larger than the convolution kernel width. The minimum and maximum of the response relative to wide dataform patterns are thus the upper and lower envelope borders of the signal waveform of the sequence of gray scale values.

The Gaussian convolution model uses the middle point between the relevant upper and lower envelope borders of the signal envelope and the minimum/maximum gray scale values (156 and 154 for transition segment 122) as input parameters. As noted, in FIG. 17, the transition point as determined for transition segment 122 is represented at position 158 along the segment between points 154 and 156. As thus determined, threshold 158 will typically not be at the midpoint between points 154 and 156. In this manner, dynamic transition point determination is provided by calculating a transition point for each transition segment selected as representing a dataform cell edge transition.

Figure 19:
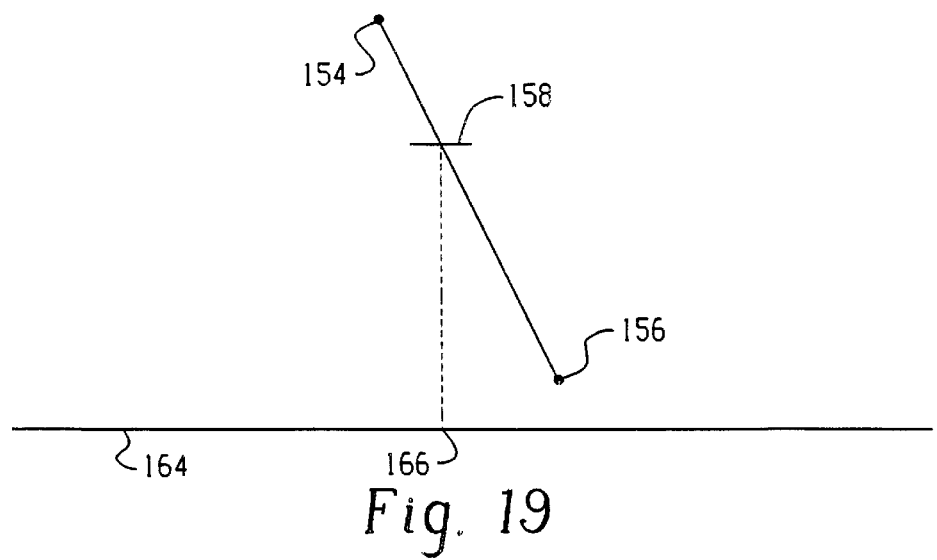

After determination of the adaptive transition point for transition segment 122, at step 142 the relevant cell edge is located. A linear interpolation is used as represented in FIG. 19. Thus, the first cell edge transition in this example is located along the sampling line (represented by line 164 in FIG. 19) at a position 166 corresponding to the point of intersection of the vertical projection of transition point 158 with line 164. As discussed, 154 and 156 represent two pixel positions along the FIG. 15 sequence of gray scale values, which represents a sampling line across the dataform image. Point 166 thus indicates the location of the first cell edge transition processed in this example.

At step 146, a determination is then made as to whether there are additional cell edge transitions to be located along the first sampling line. If so, steps 138 through 142 are repeated (by activation via path 145) for each remaining cell edge transition to be located along this sampling line. If additional cell edge transitions remain to be located, it will be apparent from the description above that the next such cell edge transition may be represented by a transition segment between gray scale values which lie along the sampling line at pixel positions beyond the particular window section represented in FIG. 17. If so, in going to the next window section action will be implemented, via path 147, to newly determine envelope borders and designate gray scale bands for purposes of noise margin implementation at steps 134 and 136, before proceeding with location of additional cell edge transitions, via steps 138, 140 and 142, as described. It will be understood that in some applications it may be adequate to determine envelope borders once for a complete sampling line, without implementation of a series of window sections.

At step 148, a determination is made as to whether cell edge transitions are to be located with reference to a second sampling line across the dataform image. If so, steps 132 through 146 are repeated (by activation via path 149) for each remaining sampling line.

At step 150 run length data is constructed to represent cell edge transitions of the dataform. Run length data is illustrated in FIG. 14. The run length data may take the form of a FIG. 14 type representation of the bars and spaces of a one row of elements of a 2D bar code, for example, or may comprise FIG. 14 type data intended to represent all elements of a multi-row 2D bar code.

At step 152, the run length data is utilized to decode all or a portion of the dataform. Decoding can be carried out in known manner as previously discussed with reference to the dataform reader of FIG. 3.

It will thus be appreciated that by use of the method as described with reference to FIG. 16, stored pixel data representative of light reflected from a 2D bar code, for example, can be processed with sub-pixel resolution in order to locate all (or an adequate number of) cell edge transitions to enable decoding of the bar code. As a result, the capability of decoding dataforms having an increased number of cells/decreased minimum cell size is improved for a sensor array having a given number of sensor elements. This increased capability avoids the need to provide a sensor array with higher pixel density or to limit the complexity of dataforms readable with a given dataform reader. As noted, when dataform complexity/minimum cell size is such as not to require sub-pixel processing, in accordance with the invention whole pixel processing is provided on a simplified basis. Signals representative of the decoded data may then be made available at output port 92 in FIG. 3 for coupling or transmission to a suitable utilization device.

With an understanding of sub-pixel processing as described, the invention may be applied for reading of dataforms as well as for other applications. Also, while methods are described with steps performed in a particular order, it will be apparent to persons skilled in the art that in other embodiments the order of steps and number and choice of specific steps used may be varied. In the described embodiment the two pixel per module resolution requirement typical of the prior art is reduced to a resolution requirement of approximately 1.2 to 1.5 pixels per module by use of the invention. This represents up to a 40 percent reduction in required sensor array resolution and a corresponding 40 percent reduction in image data memory capacity, without significant reduction in overall cell edge detection accuracy. For a corresponding two-dimensional application, sensor and storage reductions of up to 64 percent, representing a 1.2 by 1.2 pixel resolution versus a prior art 2 by 2 pixel resolution minimum are provided.

Although the preceding discussion is focused on a preferred embodiment of the described method to achieve sub-pixel resolution and decoding of dataforms, pixel data images may include elements representative of any form of image. Use of the invention permits acquisition and storage of an image at lower resolution, while still enabling accurate detection of the position of elements of the image.

Figure 20:
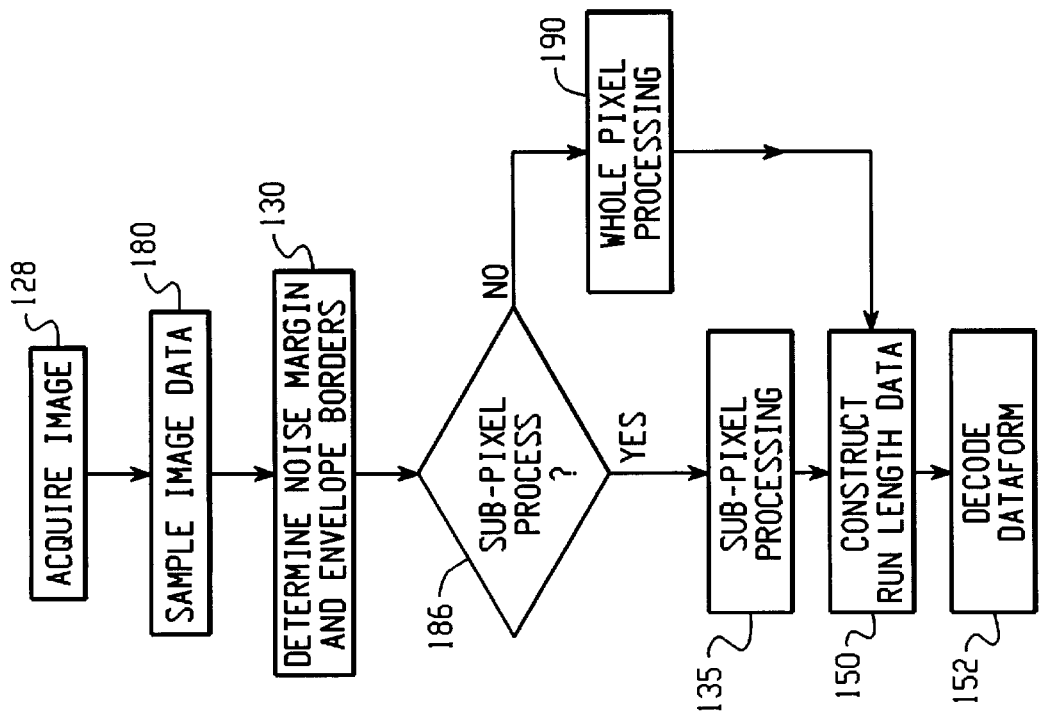
FIG. 20 is a flow chart of a processing resolution selection method according to the invention.
Figure 22:
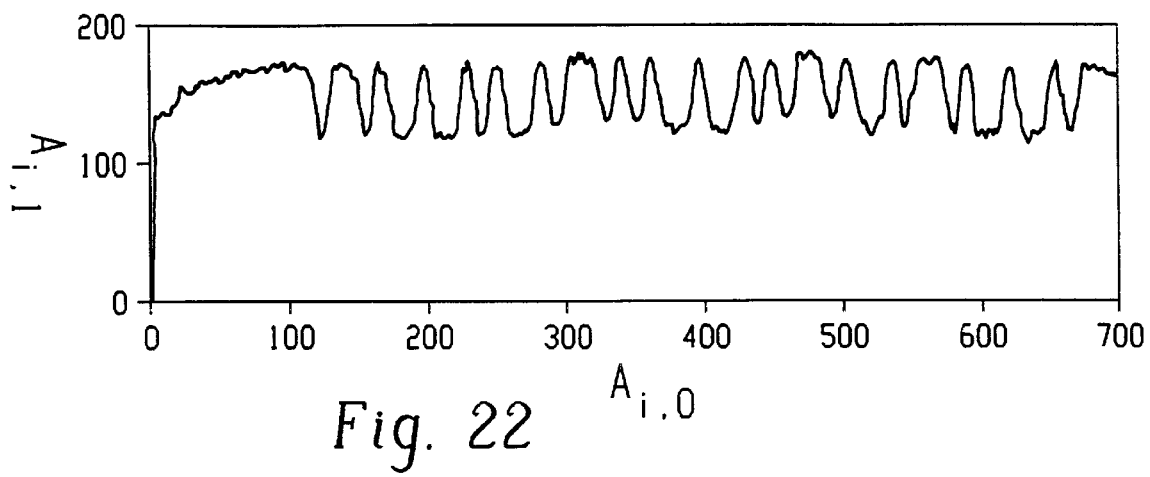
FIG. 22 shows gray scale pixel values along a sampling line for a dataform having a relatively wide module width.

Turning now to FIG. 20, in a preferred embodiment of the invention, the dataform reader is adapted to handle a wide range of bar code module widths and noise variations, with improved efficiency by choice of appropriate processing resolution. The sub-pixel processing described in the method of FIG. 16 may require additional processing steps and time which may not be necessary for a particular dataform. For example, as illustrated in FIG. 22, the minimum cell dimension for a particular dataform may be such that cell edges can be easily determined without requiring sub-pixel processing. For such dataforms, it is desirable to determine whether sub-pixel processing is needed, as described above. In FIG. 20 the method as shown includes the steps of acquiring the image at 128 and determining a noise margin at 130. At step 180, a number of initial samplings at different orientations in the middle of the image may be used to provide image data used to estimate parameters such as noise margin and initially determine the upper and lower envelopes of signals at step 130, as previously described with reference to the sub-pixel method FIG. 16.

At this point, step 186 provides a determination of whether sub-pixel processing is necessary, based upon the characteristics of the image represented by the histogram properties as described. A histogram is thus derived based on a sequence of gray scale values and a decision as to use of sub-pixel edge detection is made based on whether the histogram characteristics are relatively uniform, rather than having a peak at the high-value end. For an image similar to that shown in FIG. 12, the histogram would be relatively uniform, indicating that sub-pixel processing would be required, while the histogram associated with an image such as shown in FIG. 22 would produce a peak at the high-value end, indicating that whole pixel processing should be adequate. The determination of whether sub-pixel processing is required can be made very quickly by use of the histogram, however any method suitable for determining whether the number of pixels per dataform module is smaller than two pixels or smaller than the optical system spot size may be employed. In some circumstances the selected processing resolution may not optimally process the image data. In such cases, the reader can be arranged to verify that either decoding errors result from the non-use of sub-pixel processing or that pixels per module are such that sub-pixel processing is not required, for example, and to automatically switch to the most effective processing level.

Also, where a series of similar dataforms are to be read, test readings can be made to verify whether whole pixel processing will provide adequate results. If so, the series of dataforms can simply be processed at a whole pixel level. The invention thus provides for adaptive selection of the processing providing most cost/time effective results and most suitable accuracy performance under a variety of operating conditions.

If, at step 186, sub-pixel processing is determined to be appropriate the FIG. 20 method proceeds to step 188. Step 188 may be considered to comprise steps 132 through 148 of FIG. 16. As described with reference to FIG. 16, the method of FIG. 20 thus carries out sub-pixel processing to locate cell edge transitions, continuing through steps 150 and 152 as previously described.

Figure 21:
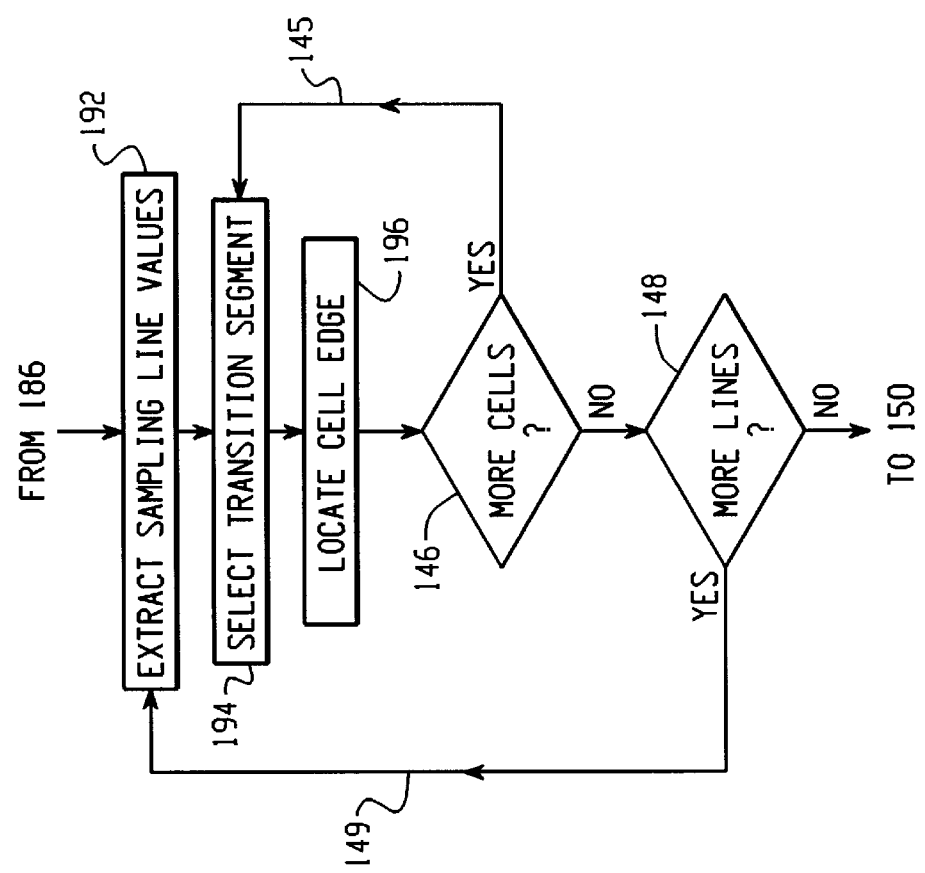
FIG. 21 is a flow chart of a whole pixel method for locating cell edge transitions in accordance with the invention.

If, at step 186, whole pixel processing is determined to be adequate for a given dataform the FIG. 20 method proceeds to step 190. Step 190 may be considered to comprise steps 192 through 196, plus steps 146 and 148, as shown in FIG. 21. In FIG. 21, step 192 corresponds to step 132 described with reference to FIG. 16. Following extraction of a sequence of gray scale values for a first sampling line at step 192, at step 194 a first transition segment between two gray scale values of the sequence is selected. The criteria for selection of transition segments in a preferred embodiment of the whole pixel processing method is simply that the magnitude of the transition segment between its gray scale end values (between its local maximum and local minimum values) exceeds the noise margin. The noise margin utilized for this purpose may be as determined in step 130, or as determined by histogram analysis or other suitable technique for the first sampling line as currently being processed.

At step 196 the cell edge transition represented by the first transition segment as selected is located. The cell edge position is taken as the mid point along the transition segment (i.e., half-way between the local maximum and minimum gray scale values for this transition segment). The location of this first cell edge transition is thus the point along the first sampling line corresponding to the vertical projection of the first transition segment mid point.

In FIG. 21, steps 146 and 148 correspond to the similarly numbered steps of FIG. 16. If additional cell edge transitions of the first sampling line remain to be located, at step 146 processing recycles to step 194, via path 145. Then, if additional rows of dataform elements remain to be processed, at step 148 processing recycles to step 192, via path 149. Additional specifics of aspects of the whole pixel processing method will be apparent from the above more detailed description of corresponding portions of the sub-pixel processing method illustrated in FIG. 16. It will thus be seen that if sub-pixel processing is not required, whole pixel processing can be carried out somewhat faster with fewer processing steps required.

Figure 23:
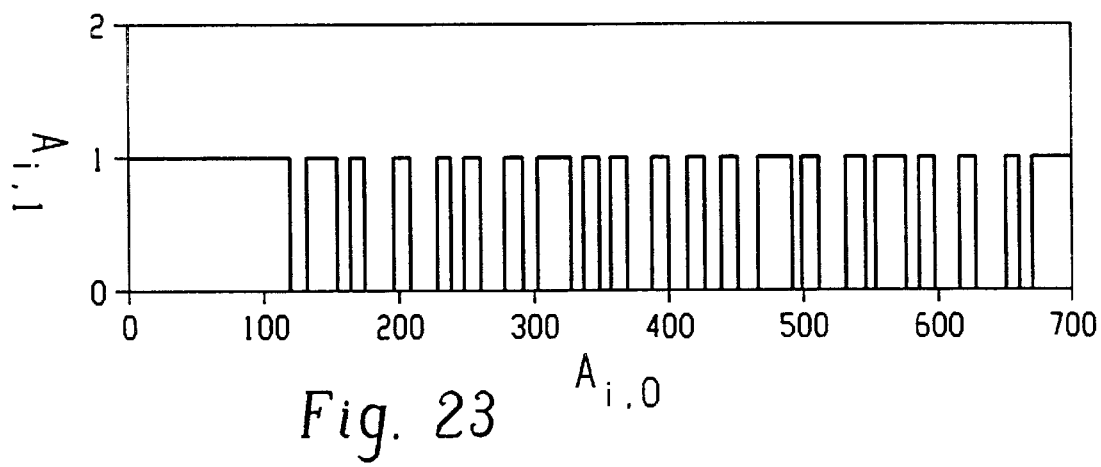
FIG. 23 shows the corresponding run-length code obtained by whole pixel scanning for the example shown in FIG. 22.

Following step 148 of FIG. 21, the whole pixel processing method is completed by implementation of steps 150 and 152 as represented in FIG. 20. FIG. 22 shows a sequence of gray scale values representing a bar code label with a relatively wide module width. FIG. 23 shows the corresponding run length data resulting from use of whole pixel processing in accordance with the invention. Based on the foregoing, it will be appreciated that the whole pixel algorithm as described is effective to eliminate or minimize the effects of spurious gray scale values resulting from noise. This is accomplished by use of the noise margin to categorize as false all transition segments of magnitude, between local maximum and minimum values, less than the noise margin. In contrast to the sub-pixel method, here the same noise margin is used regardless of the gray scale values of the transition segment end points. A larger noise margin permits successful operation with lower signal-to-noise ratio gray scale pixel data. Since the noise effects relevant to present considerations are principally determined by characteristics of the illumination and sensor sensitivity, in a currently preferred embodiment a single noise margin is determined and then used in processing of the entire image. As a result, the whole pixel resolution edge detection algorithm is capable of generating accurate run length data in the presence of severe noise. This is achieved regardless of the dataform element dimensions (e.g., bar code element widths) so long as such dimensions are larger than the threshold set for selection of the sub-pixel processing algorithm as already discussed. In other embodiments it may be desirable to periodically recompute the noise margin or check the sub-pixel selection threshold condition, or both, during the process of reading a complete dataform or series of similar dataforms.

A basic method of locating dataform cell edge transitions by use of the invention may thus include the steps of:

(a) acquiring a sequence of gray scale values for pixels representing a first sampling line crossing at least a first cell edge transition of a reflected image, and wherein high and low reflectance values are respectively represented within high and low ranges of gray scale values;

(b) selecting a transition segment having a segment magnitude between local maximum and local minimum gray scale values of the sequence;

(c) determining whether the transition segment meets one of the following critieria: (i) segment magnitude exceeds a noise margin; and (ii) neither of the local maximum and local minimum gray scale values is within the high and low ranges of gray scale values; and (d) if the transition segment meets at least one of the step (c) criteria, locating the first cell edge transition along the first sampling line by use of the transition segment.

This basic method can be augmented by one or more of the above-described steps directed to: use of Gaussian convolution calculations for adaptive selection of transition points; automatic choice of sub-pixel or whole pixel processing; use of histogram analysis to set a noise margin; setting of high and low gray scale ranges for application of the noise margin in accordance with the invention; etc.

Figure 24:
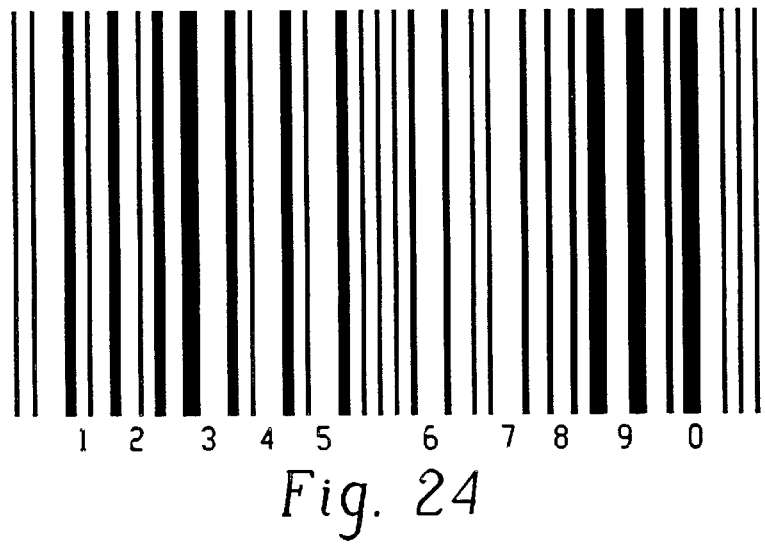
FIG. 24 illustrates a bar code dataform including both bar elements and characters.

The pixel scanner of the invention, whether performing sub-pixel or whole pixel processing, can be used beneficially for optical character recognition also. In the preferred embodiment of the invention, the optical system provides an imaging system in conjunction with the sensor array which can be utilized in performing optical character recognition of data character elements in the target field. In many situations, dataforms include characters, such as numbers, corresponding to bar code information also in the dataform. The optical imaging system allows such characters to be read and decoded using OCR techniques, thus allowing even a damaged bar code to be properly decoded. In a simple example, a 1D bar code such as shown in FIG. 24 may have become damaged so that a portion of the series of bar code elements has been damaged. In addition various number characters may also be damaged so as to be unreadable. The probability of accurately decoding such dataforms can be enhanced by combining decoded bar code information with decoded character recognition information, by which the damaged areas can be filled in to properly decode the bar code. The reader of the invention allows the location of character information to be precisely determined to facilitate OCR processing of the characters with reduced processing times. The OCR methods may thus be performed only on the portion of the dataform that is needed to fill in gaps in the bar code information as an example. The invention thus provides a great deal of flexibility for use with a variety of dataforms.

In the method of the invention, detecting the position of a cell is primarily implemented by the use in operation of computer programming executed by CPU 88 shown in FIG. 3. In the preferred embodiment, because floating point operations are more time consuming, integer operation may be used in all calculations. For example, integers of a power of two may be used whenever possible to reduce integer multiplication and division into shift operations. As an example, the distance between two adjacent transition pixels may be chosen to be an integer of two, simplifying detection of the sub-pixel edge.

While there have been described the currently preferred embodiments of the invention, those skilled in the art will recognize that other and further modifications may be made without departing from the invention, and it is intended to claim all modifications and variations as fall within the scope of the invention.

What is claimed is:

1. In a dataform reader, a method of locating dataform cell edge transitions in a reflected image of a dataform which includes high and low reflectance regions, comprising the steps of:

(a) acquiring a sequence of gray scale values for pixels representing a first sampling line crossing at least a first cell edge transition of said reflected image, and wherein said high and low reflectance regions are respectively represented within a high range of gray scale values and a low range of gray scale values, which are separated by a mid-range of gray scale values;

(b) selecting a transition segment having a segment magnitude value indicative of the difference in gray scale values between a specific local maximum gray scale value and a local minimum gray scale value of said sequence, which represent the ends of said segment;

(c) determining whether said transition segment meets the following criteria: (i) said segment magnitude value exceeds a noise margin value; and (ii) at least one of said local maximum and local minimum gray scale values is within said mid-range between said high and low ranges of gray scale values; and (d) if said transition segment meets at least one of said step (c) criteria, locating said first cell edge transition along said first sampling line by use of said transition segment and if neither criteria is met, not utilizing said transition segment for cell edge transition location.

2. In a dataform reader, a method as in claim 1, wherein step (d) comprises:

(d)(1) determining a transition point along said transition segment as a function of said local maximum and local minimum gray scale values; and (d)(2) locating said first cell edge transition along said first sampling line at a point corresponding to said transition point.

3. In a dataform reader, a method as in claim 2, wherein step (d)(2) includes calculating said transition point by application of a Gaussian convolution model.

4. In a dataform reader, a method as in claim 1, additionally including the step of:

(e) repeating steps (b) through (d) for second and further cell edge transitions along said first sampling line.

5. In a dataform reader, a method as in claim 4, additionally including the step of:

(f) repeating steps (a) through (e) for a second sampling line.

6. In a dataform reader, a method as in claim 5, additionally including the step of:

(g) constructing run length data representing cell edge transitions along said sampling lines.

7. In a dataform reader, a method as in claim 6, additionally including the step of:

(h) utilizing said run length data to decode at least a portion of said dataform.

8. In a dataform reader, a method as in claim 4, additionally including the step of:

(f) utilizing cell edge transition location data to decode at least a portion of said dataform.

9. In a dataform reader, a method as in claim 1, including between steps (a) and (b) the additional step of:

(x) determining that said reflected image includes dataform cell dimensions represented at less than two pixels-per-cell nominal resolution, prior to implementing steps (b) through (d).

10. In a dataform reader, a method as in claim 1, including prior to step (c) the additional step of:

(y) determining, for use in step (c), a noise margin based upon an estimate of the magnitude of noise present in said sequence of gray scale values.

11. In a dataform reader, a method as in claim 10, wherein in step (y) said noise margin is determined by analysis of histogram data.

12. In a dataform reader, a method of locating dataform cell edge transitions in a reflected image of a dataform which includes high and low reflectance regions comprising the steps of:

(a) acquiring a sequence of gray scale values for pixels representing a first sampling line crossing at least a first cell edge transition of said reflected image, and wherein said high and low reflectance regions are respectively represented within a high range of gray scale values and a low range of gray scale values, which are separated by a mid-range of such values;

(b) selecting a first window portion of said sequence;

(c) selecting borders of said high and low gray scale ranges for said first window section;

(d) selecting a transition segment having a segment magnitude value indicative of the difference in gray scale values between a specific local maximum gray scale value and a local minimum gray scale value of said sequence, which represent the ends of said segment;

(e) determining whether said transition segment meets the following criteria: (i) said segment magnitude value exceeds a noise margin value and (ii) at least one of said local maximum and local minimum gray scale values is within said mid-range between said high and low ranges of gray scale values; and (f) if said transition segment meets at least one of said step (e) criteria, locating said first cell edge transition along said first sampling line by use of said transition segment and if neither criteria is met, not utilizing said transition segment for cell edge transition location.

13. In a dataform reader, a method as in claim 12, wherein in step (c) the borders of said high and low gray scale ranges are determined so that the high gray scale range includes all gray scale values representative of illumination reflected from a white portion of said dataform and the low gray scale range includes all gray scale values representative of illumination reflected from a black portion of said dataform.

14. In a dataform reader, a method as in claim 12, wherein in step (c) the borders of said high and low gray scale ranges are determined so that the high gray scale range includes the highest gray scale values represented by illumination reflected from any portion of said dataform and the low gray scale range includes the lowest gray scale values represented by illumination reflected from any portion of said dataform.

15. In a dataform reader, a method as in claim 12, wherein said first window portion comprises one of: part of said sequence; and all of said sequence.

16. In a dataform reader, a method as in claim 12, additionally including the following step:

(g) repeating steps (d) through (f) for a second transition segment within said first window portion.

17. In a dataform reader, a method as in claim 16, additionally including the following step:

(h) repeating steps (b) through (g) for at least a second window portion.

18. In a dataform reader, a method as in claim 17, additionally including the following steps:

(j) constructing run length data representing cell edge transition locations for at least a portion of said dataform; and (k) utilizing said run length data to decode said dataform.

* * * * *